United States Patent
Okuno et al.

(10) Patent No.: US 6,501,892 B1
(45) Date of Patent: Dec. 31, 2002

(54) DISPERSION-COMPENSATING FIBER

(75) Inventors: Toshiaki Okuno, Yokohama (JP);
Shinji Ishikawa, Yokohama (JP);
Tomonori Kashiwada, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/580,971

(22) Filed: May 30, 2000

Related U.S. Application Data

(63) Continuation-in-part of application No. PCT/JP99/04413, filed on Aug. 17, 1999.

(30) Foreign Application Priority Data

Sep. 18, 1998 (JP) .................................... 10-265453

(51) Int. Cl.[7] .............................. G02B 6/02; G02B 6/16
(52) U.S. Cl. ........................................ 385/127; 385/123
(58) Field of Search ................................ 385/127, 123, 385/126, 128, 124

(56) References Cited

U.S. PATENT DOCUMENTS

| | | | |
|---|---|---|---|
| 5,361,319 A | | 11/1994 | Antos et al. |
| 5,448,674 A | * | 9/1995 | Vengsarkar et al. ......... 385/123 |
| 5,740,297 A | * | 4/1998 | Onishi et al. ................ 385/127 |
| 5,838,867 A | * | 11/1998 | Onishi et al. ................ 385/123 |
| 5,999,679 A | * | 12/1999 | Antos et al. ................ 359/900 |
| 6,263,138 B1 | | 7/2001 | Sillard et al. |
| 6,349,163 B1 | * | 2/2002 | Antos et al. ................ 385/127 |
| 6,404,967 B2 | * | 6/2002 | Arai et al. ................... 359/161 |
| 2002/0012510 A1 | | 1/2002 | Jiang et al. |

FOREIGN PATENT DOCUMENTS

| | | |
|---|---|---|
| EP | 0 598 554 A1 | 11/1993 |
| JP | 6-11620 | 1/1994 |
| JP | 7-270636 | 10/1995 |
| JP | 8-313750 | 11/1996 |
| JP | 9-127354 | 5/1997 |
| JP | 10-39155 | 2/1998 |
| JP | 10-319266 | 12/1998 |

OTHER PUBLICATIONS

K1998–690 24th European Conference on Optical Communication Sep. 20–24, 1998 Midrid, Spain.
Electronics Letters The Institute of Electrical Engineers Dec. 5, 1996 Elleak 32(25) vol. 32 2293–2360 No. 25 ISSN 0013–5194.

* cited by examiner

*Primary Examiner*—Hemang Sanghavi
*Assistant Examiner*—Scott A Knauss
(74) *Attorney, Agent, or Firm*—McDermott, Will & Emery

(57) ABSTRACT

The dispersion-compensating fiber according to the present invention is an optical fiber having a structure which, when constituting an optical transmission line together with a dispersion-shifted fiber, whose zero-dispersion wavelength is in a 1.5-$\mu$m wavelength band, for guiding light signals in the 1.5-$\mu$m wavelength band or 1.6-$\mu$m wavelength band, is capable of improving transmission characteristics of the whole optical transmission line and allowing the dispersion to be compensated for efficiently and the size thereof to become smaller; and has a structure for improving the total dispersion slope of the optical transmission line while in a state fully compensating for the dispersion of the dispersion-shifted fiber. This dispersion-compensating fiber has a triple cladding structure having a first cladding, a second cladding, and a third cladding which are successively provided on the outer periphery of a core; and, in a state where the relative refractive index differences in the regions and outside diameters thereof are optimized so as to compensate for the dispersion-shifted fiber, realizes an optical transmission system having a favorable total dispersion slope.

6 Claims, 16 Drawing Sheets

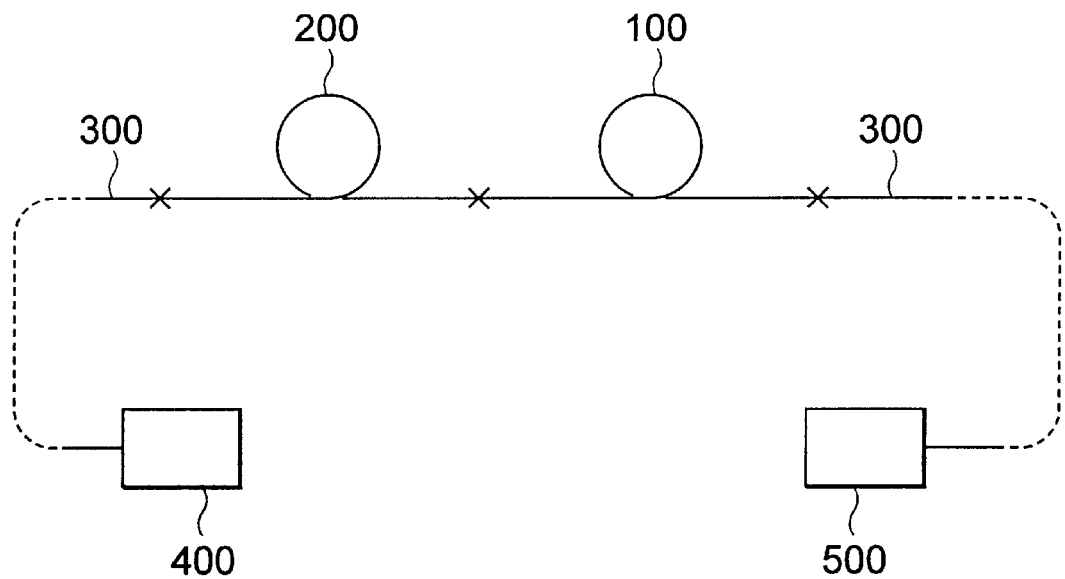

CORE OUTSIDE DIAMETER 2a (μm)

BENDING LOSS AT DIAMETER OF 40mm (dB/m)

DISPERSION-COMPENSATING FIBER

RELATED APPLICATIONS

This is a Continuation-In-Part application of International Patent application No. PCT/JP99/04413 filed on Aug. 17, 1999, now pending, which in turn claims the benefit of Japanese Patent Application No. 265453/1998, filed Sep. 18, 1998, the disclosures of which Applications are incorporated by reference herein. The benefit of the filing and priority dates of the International and Japanese Applications is respectfully requested.

BACKGROUND OF THE INVENTION

1. Field of the Invention

The present invention relates to a dispersion-compensating fiber which is employed to an optical transmission line including a dispersion-shifted fiber capable of long-haul, large-capacity optical communications utilizing wavelength division multiplexing (WDM) signals in a 1.5-μm wavelength band or 1.6-μm wavelength band and compensates for the dispersion of the dispersion-shifted fiber.

2. Related Background Art

In optical fiber transmission line networks used for high-speed, large-capacity communications over a long haul, the dispersion (chromatic dispersion) expressed by the sum of the material dispersion (dispersion caused by the wavelength dependence of refractive index inherent in the material of the optical fiber) and structural dispersion (dispersion caused by the wavelength dependence of the group velocity in the propagation mode) in the single-mode optical fiber employed as their transmission medium is a limiting factor for the transmission capacity. Namely, even when light outputted from a light source is assumed to have a single wavelength, it has an uniform spectrum width in the strict sense. When such an optical pulse propagates through a single-mode optical fiber having a predetermined chromatic dispersion characteristic, the pulse form may collapse since the propagation velocity varies among definite spectral components. This dispersion is expressed by a unit (ps/km/nm) of propagation delay time difference per unit spectrum width (nm) and unit optical fiber length (km). Also, it has been known that the material dispersion and structural dispersion cancel each other in the single-mode optical fiber, so that the dispersion becomes zero in the vicinity of 1.31 μm.

A dispersion-shifted fiber is an optical fiber whose zero-dispersion wavelength has been shifted from a 1.3-μm wavelength band to a 1.55-μm wavelength band since the transmission loss of optical fibers becomes the lowest in the 1.55-μm wavelength band; and a dispersion-compensating fiber is used as means for compensating for the dispersion of the dispersion-shifted fiber in general. As a technique for compensating for such a dispersion-shifted fiber, Japanese Patent Application Laid-Open No. HEI 10-39155 discloses a dispersion-compensating fiber and an optical transmission system using the same, for example.

Though being designed such that its dispersion becomes zero at a predetermined wavelength near the wavelength of 1.55 μm, the dispersion-shifted fiber has a positive dispersion slope, thus being hard to suppress the occurrence of chromatic dispersion over the whole wavelength band in use. As a consequence, in communications based on the wavelength division multiplexing (WDM) system, which multiplexes light signals having wavelengths different from each other and thereby enables the transmission capacity to further increase, and the like, various transmission characteristics may deviate among wavelengths. For this matter, the above-mentioned dispersion-compensating fiber disclosed in Japanese Patent Application Laid-Open No. HEI 10-39155 is configured so as to improve the dispersion slope of the optical transmission line including the dispersion-shifted fiber as well.

Here, the dispersion slope is given by the gradient of a graph which indicates chromatic dispersion, and is expressed by a unit (ps/nm$^2$/km).

SUMMARY OF THE INVENTION

The inventors have studied the conventional dispersion-compensating fiber and, as a result, have found problems as follows. Namely, the conventional dispersion-compensating fiber aimed at compensating for the dispersion of the dispersion-shifted fiber has a small chromatic dispersion, thereby necessitating a longer fiber length for compensating for the dispersion of the dispersion-shifted fiber. As a consequence, the efficiency of dispersion compensation has been low, and the apparatus and the like have inevitably increased their size. In addition, various characteristics of the conventional dispersion-compensating fiber applied to the dispersion-shifted fiber to be compensated for have not fully been optimized, and the dispersion slope in the optical transmission line to which the dispersion-shifted fiber is applied has not been improved sufficiently.

In order to overcome the foregoing problems, it is an object of the present invention to provide a dispersion-compensating fiber comprising a structure which compensates for the dispersion of a dispersion-shifted fiber, improves the total dispersion slope of an optical transmission system including the dispersion-shifted fiber over a wider wavelength band when applied thereto, and enables the dispersion to be compensated for efficiently and the apparatus to become smaller.

The dispersion-compensating fiber according to the present invention guides light signals of a 1.5-μm wavelength band or 1.6-μm wavelength band. It is an optical fiber for compensating for the dispersion of a dispersion-shifted fiber having a zero-dispersion wavelength in the 1.5-μm wavelength band, and comprises a core region extending along a predetermined reference axis and a cladding region provided on the outer periphery of the core region. The core region is constituted by a core having an outside diameter $2a$. The cladding region is constituted by a first cladding provided on the outer periphery of the core and having an outside diameter $2b$; a second cladding provided on the outer periphery of the first cladding and having an outside diameter $2c$; and a third cladding provided on the outer periphery of the second cladding.

In this dispersion-compensating fiber, the refractive index $n_1$ of the core, the refractive index $n_2$ of the first cladding, the refractive index $n_3$ of the second cladding, and the refractive index $n_4$ of the third cladding satisfy the condition of $n_1 > n_3 > n_4 > n_2$. Also, the respective relative refractive index differences $\Delta_1$ and $\Delta_2$ of the core and first cladding with respect to the third cladding satisfy at least the conditions of $1\% \leq \Delta_1 \leq 3\%$, and $\Delta_2 \leq -0.4\%$. The outside diameter $2a$ of the core and the outside diameter $2c$ of the second cladding preferably satisfy the condition of $2a/2c \leq 0.3$.

In this dispersion-compensating fiber, it is preferably that the relative refractive index difference $\Delta_3$ of the second cladding with respect to the third cladding satisfies the condition of $\Delta_3 \leq 0.25\%$, further preferably $\Delta_3 \leq 0.15\%$. Additionally, the outside diameter $2b$ of the first cladding and the outside diameter 2c of the second cladding preferably satisfy the condition of $2b/2c \leq 0.3$.

The dispersion-compensating fiber according to the present invention is characterized in that, when constituting an optical transmission system together with a dispersion-shifted fiber through which light signals of the 1.5-μm wavelength band or 1.6-μm wavelength band propagate, it has a length sufficient for the optical transmission system to yield a total dispersion slope of $-0.024$ ps/nm$^2$/km or more but $0.024$ ps/nm$^2$/km or less with respect to respective light signals having a shortest wavelength $\lambda_S$ and a longest wavelength $\lambda_L$ in signal wavelengths within the wavelength band in use.

Specifically, the dispersion-compensating fiber has a length $L_{DCF}$ which is set so as to satisfy the following condition with respect to light having a wavelength $\lambda_m$ in signal wavelengths within the wavelength band in use:

$$|D_{DSF}(\lambda m) \cdot L_{DSF} + D_{DCF}(\lambda m) \cdot L_{DCF}| \leq 200 \text{ ps/nm}$$

where $D_{DSF}(\lambda m)$ is the dispersion of the dispersion-shifted fiber at the wavelength $\lambda m$;

$L_{DSF}$ is the length of the dispersion-shifted fiber;

$D_{DCF}(\lambda m)$ is the dispersion of the dispersion-compensating fiber at the wavelength $\lambda m$; and $L_{DCF}$ is the length of the dispersion-compensating fiber.

More preferably, the length $L_{DCF}$ of the dispersion-compensating fiber is set so as to satisfy the following condition with respect to all signal wavelengths $\lambda_{all}$ of light within the wavelength band in use:

$$|D_{DSF}(\lambda_{all}) \cdot L_{DSF} + D_{DCF}(\lambda_{all}) \cdot L_{DCF}| \leq 200 \text{ ps/nm}$$

where $D_{DSF}(\lambda_{all})$ is the dispersion of the dispersion-shifted fiber at all the wavelengths $\lambda_{all}$ in use;

$L_{DSF}$ is the length of the dispersion-shifted fiber;

$D_{DCF}(\lambda_{all})$ is the dispersion of the dispersion-compensating fiber at all the wavelengths $\lambda_{all}$ in use; and $L_{DCF}$ is the length of the dispersion-compensating fiber.

Also, the relative refractive index difference $\Delta_1$ of the core with respect to the third cladding preferably satisfies the condition of $1\% \leq \Delta_1 \leq 2\%$ if a lower transmission loss is required, and preferably satisfies the condition of $2\% \leq \Delta_1 \leq 3\%$ if a higher dispersion compensation efficiency is required due to a higher dispersion, and the range of $\Delta_1$ can be set appropriately in view of various conditions such as use, equipment, and the like.

Thus, the dispersion-compensating fiber comprising a core region having a single core and a cladding region provided on the outer periphery of the core region and having three claddings (a triple cladding structure) can improve the total dispersion slope in the optical transmission system to which the dispersion-compensating fiber is applied, if the refractive index and outside diameter of each part thereof are set so as to satisfy such conditions as those mentioned above. Also, when the dispersion-compensating fiber is formed into a module, it is possible to select a chromatic dispersion having an absolute value which is large enough to enable the dispersion to be compensated for efficiently and the apparatus to become smaller.

In particular, while the dispersion-shifted fiber has a large dispersion slope notwithstanding the fact that its dispersion has a small absolute value, the dispersion compensation effected by a dispersion-compensating fiber having a double cladding structure cannot compensate for the dispersion slope and the dispersion at the same time, or necessitates a length on a par with the dispersion-shifted fiber to be compensated for. Further, there are practical problems such as greater bending loss. When the triple cladding structure as mentioned above is employed in the cladding region, various characteristics of the dispersion-compensating fiber can be optimized for overcoming such problems.

For example, in the dispersion-compensating fiber having a triple cladding structure, the length of the dispersion-compensating fiber necessary for dispersion compensation can be made shorter as the absolute value of the dispersion having a negative value is greater, whereby the dispersion compensation can be made more efficient. In particular, the fact that the relative refractive index difference $\Delta_1$ of the core with respect to the third cladding is 1% or more but 3% or less is equivalent to the fact that, for example, the dispersion with respect to light having a wavelength of 1.55 μm is about $-200$ ps/nm/km or more but 0 ps/nm/km or less.

Also, the fact that the relative refractive index difference $\Delta_1$ of the core with respect to the third cladding is 1% or more but 2% or less is equivalent to the fact that, for example, the dispersion with respect to light having a wavelength of 1.55 μm is about $-100$ ps/nm/km or more but 0 ps/nm/km or less. Similarly, the fact that the relative refractive index difference $\Delta_1$ of the core with respect to the third cladding is 2% or more but 3% or less is equivalent to the fact that, for example, the dispersion with respect to light having a wavelength of 1.55 μm about $-200$ ps/nm/km or more but $-100$ ps/nm/km or less.

Though the dispersion increases as the value of $\Delta_1$ is enhanced, it is necessary that, for example, the amount of $GeO_2$ added to the core be increased in order to enhance the value of $\Delta_1$. On the other hand, an increase in the amount of addition of $GeO_2$ causes the transmission loss to increase. Therefore, it is preferred that, within the range of condition concerning $\Delta_1$, the condition of $1\% \leq \Delta_1 \leq 2\%$ and the condition of $2\% \leq \Delta_1 \leq 3\%$ be appropriately selected, in view of various conditions such as use, equipment, and the like, in the respective cases where a lower transmission loss and a higher dispersion compensation efficiency due to a higher dispersion are required.

Here, in the dispersion-compensating fiber according to the present invention, the relative refractive index difference $\Delta_3$ of the second cladding with respect to the third cladding preferably satisfies the condition of $\Delta_3 \geq 0.1\%$. Also, the ratio of the outside diameter of the core to the outside diameter of the first cladding preferably satisfies the condition of $0.2 \leq 2a/2b \leq 0.5$. In addition, with respect to light having a wavelength of 1.55 μm, the dispersion-compensating fiber according to the present invention has a bending loss of 10 dB/m or less at a diameter of 60 mm, a polarization mode dispersion of 0.5 ps·km$^{-\frac{1}{2}}$ or less, and a transmission loss of 1 dB/km or less.

In practice, there is a case where such a dispersion-compensating fiber is employed as a small-size module wound like a coil. In this case, in particular, lowering the bending loss enables the apparatus to reduce its size and suppress its accompanying increase in transmission loss.

When an optical transmission system is constituted by a dispersion-shifted fiber through which WDM signals of the 1.55-μm wavelength band propagate and the dispersion-compensating fiber having a length sufficient for compensating for the dispersion of the dispersion-shifted fiber as mentioned in the foregoing, this optical transmission system yields a total dispersion slope of $-0.024$ ps/nm$^2$/km or more but 0.024 ps/nm$^2$/km or less, preferably −0.012 ps/nm$^2$/km or more but 0.012 ps/nm$^2$/km or less, with respect to respective light signals having the shortest wavelength $\lambda_S$ and the longest wavelength $\lambda_L$ in signal wavelengths within the wavelength band in use.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1A is a view showing a cross-sectional structure of a dispersion-compensating fiber according to the present invention, whereas

FIG. 2 is a view showing an example of an optical transmission system to which the dispersion-compensating fiber according to the present invention is applied;

DETAILED DESCRIPTION OF THE PREFERRED EMBODIMENTS

Figure 1A:
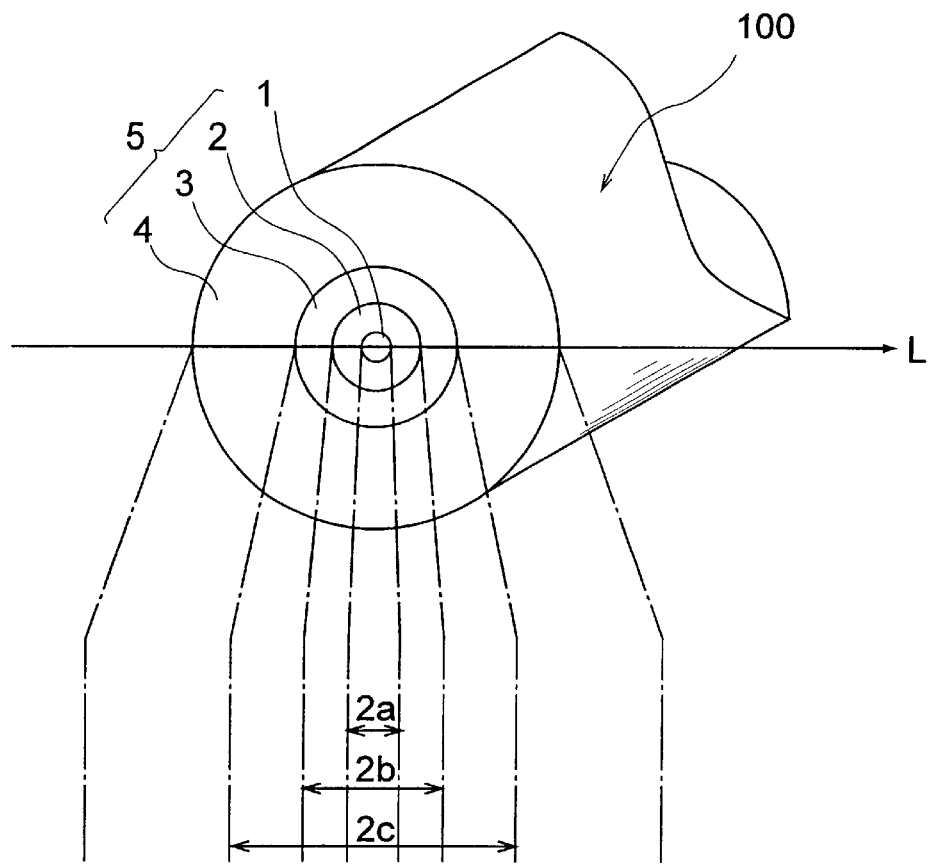

In the following, embodiments of the dispersion-compensating fiber according to the present invention will be explained with reference to FIGS. 1A, 1B, 2, 3A to 3C, 4, 5A to 5C, 6, 7, 8A to 8E, 9 to 17, 18A to 18C, and 19 to 22. Here, constituents identical to each other in the drawings will be referred to with numerals or letters identical to each other without repeating their overlapping explanations. Also, ratios of dimensions in the drawings do not always match those explained.

Figure 1B:
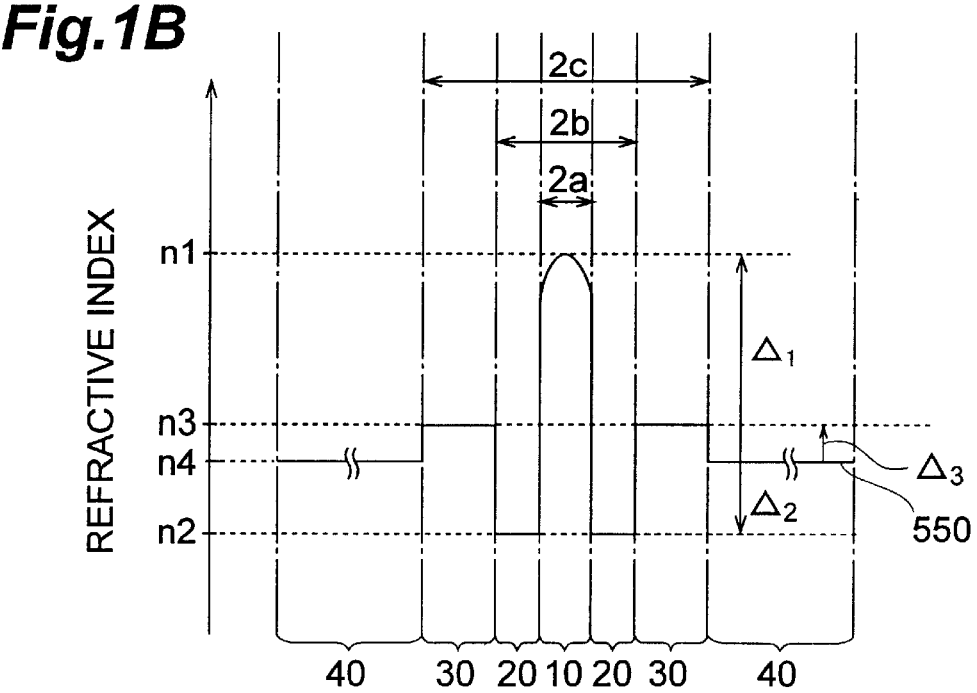
FIG. 1B is a chart showing the refractive index profile of the dispersion-compensating fiber shown in FIG. 1A.

FIG. 1A is a view showing a cross-sectional structure of a dispersion-compensating fiber according to the present invention. This dispersion-compensating fiber 100 comprises a core region having a core 1 with an outside diameter $2a$; and a cladding region 5 of a triple cladding structure constituted by a first cladding 2 provided on the outer periphery of the core 1 and having an outside diameter 2b, a second cladding 3 provided on the outer periphery of the first cladding 2 and having an outside diameter 2c, and a third cladding 4 provided on the outer periphery of the second cladding 3. FIG. 1B is a chart showing a refractive index profile 550 of the dispersion-compensating fiber 100 shown in FIG. 1A in a diametric direction thereof (direction indicated by the line L in the chart). Here, the abscissa of the refractive index profile 550 shown in FIG. 1B corresponds to individual parts along the line L in FIG. 1A on a cross section perpendicular to the center axis of the core 1. Hence, in the refractive index profile 550 in FIG. 1B, areas 10, 20, 30, and 40 indicate the refractive indices of individual parts on the line L of the core 1, first cladding 2, second cladding 3, and third cladding 4, respectively.

The dispersion-compensating fiber 100 is an optical waveguide mainly composed of $SiO_2$ (silica glass), and its characteristics are controlled by the outside diameter and refractive index of each region constituting the dispersion-compensating fiber 100, and the like. Here, Δ in the refractive index profile 550 shown in FIG. 1B indicates the relative refractive index difference of each region with reference to the refractive index of the third cladding 4, and is defined as follows:

$$\Delta_1 = (n_1 - n_4)/n_4$$

$$\Delta_2 = (n_2 - n_4)/n_4$$

$$\Delta_3 = (n_3 - n_4)/n_4$$

Here, $n_1$, $n_2$, $n_3$, and $n_4$ are refractive indices of the core1, first cladding 2, second cladding 3, and third cladding 4, respectively. Also, the relative refractive index difference Δ in this specification is expressed in terms of percent, and the refractive indices of individual regions in each defining expression may be arranged in any order. Consequently, a negative value of Δ indicates that the refractive index of its corresponding region is lower than the refractive index of the third cladding 4.

The dispersion-compensating fiber according to the present invention is configured such that the respective refractive indices of the above-mentioned individual regions 1 to 4 satisfy the following condition (1):

$$n_1 > n_3 > n_4 > n_2 \quad (1)$$

As a consequence, the respective relative refractive index differences of the individual regions with respect to the third cladding 4 satisfy the following condition (1a):

$$\Delta_1 > \Delta_3 > 0\% > \Delta_2 \quad (1a)$$

(Conditions (1) and (1a) are equivalent to each other.) Namely, they are configured such that $\Delta_1$ and $\Delta_3$ have positive values, $\Delta_2$ has a negative value, and $\Delta_1$ has the largest value.

An optical fiber with a triple cladding structure having such a refractive index profile is constructed, for example, as follows. The outermost third cladding 4 is formed from $SiO_2$. In contrast, the core 1 and the second cladding 3, which are mainly composed of $SiO_2$, are doped with respective predetermined amounts of $GeO_2$, such that their refractive indices are controlled so as to become higher than the refractive index of $SiO_2$. On the other hand, the first cladding 2 mainly composed of $SiO_2$ is doped with a predetermined amount of F (fluorine), such that its refractive index is controlled so as to become lower than that of $SiO_2$. Here, the configuration mentioned above is just an example of specific methods and configurations of refractive index control by means of such impurity doping, which is not restrictive. For example, the third cladding 4 may not be pure $SiO_2$, but may be doped with a predetermined amount of a refractive index adjusting agent such as F.

Their respective relative refractive index differences further satisfy the following conditions (2) and (3):

$$1\% \leq \Delta_1 \leq 3\% \quad (2)$$

$$\Delta_2 \leq -4\% \quad (3)$$

Also, their respective outside diameters satisfy the following condition (4):

$$2a/2c \leq 0.3 \quad (4)$$

When the refractive index and outside diameter of each region are set as mentioned above, a dispersion-compensating fiber capable of sufficiently improving a dispersion slope is obtained. Also, when the following conditions (5) and (6):

$$\Delta_3 \geq 0.1\% \quad (5)$$

$$0.2 \leq 2a/2b \leq 0.5 \quad (6)$$

are satisfied, a further preferable dispersion-compensating fiber is obtained.

Here, the dispersion of the dispersion-compensating fiber is, for example, with respect to a wavelength of 1.55 μm, about 0 ps/nm/km when $\Delta_1=1\%$, and about −200 ps/nm/km when $\Delta_1=3\%$. Consequently, if the value of $\Delta_1$ is increased within the range of $1\% \leq \Delta_1 \leq 3\%$ of condition (2) concerning the relative refractive index difference $\Delta_1$ of the core 1 with respect to the third cladding 4, then the absolute value of the dispersion having a negative value can be enhanced, whereby the dispersion compensation can be made more efficient. In order to increase the value of $\Delta_1$, on the other hand, it is necessary that, for example, the amount of $GeO_2$ added to the core 1 be increased so as to enhance the refractive index $n_1$ thereof. In this case, however, transmission loss would increase due to the increase in Rayleigh scattering caused by $GeO_2$ being added, and the like. Since the upper limit value of $\Delta_1$ is set to 3%, the dispersion-compensating fiber according to the present invention can suppress the transmission loss thereof to 1dB/km or less, while securing sufficient dispersion compensation for the dispersion-shifted fiber to be compensated for.

Further, the range of condition (2) may be changed to the following two conditions (7) and (8):

$$1\% \leq \Delta_1 \leq 2\% \quad (7)$$

$$2\% \leq \Delta_1 < 3\% \quad (8)$$

Respective dispersion-compensating fibers satisfying these two conditions may be selected as necessary. Namely, $\Delta_1$ may be selected so as to match condition (7) if a lower transmission loss is more important, whereas $\Delta_1$ matching condition (8) may be selected if a higher dispersion is more important.

Also, while polarization mode dispersion (PMD) enhances along with increases in out-of-roundness which represents the deviation of the form of the core 1 from a perfect circle, the polarization mode dispersion caused by the deviation from the perfect circle also increases as the refractive index of the core 1 is greater, i.e., the value of $\Delta_1$ is greater. Since the upper limit of $\Delta_1$ is suppressed to 3% or less, the dispersion-compensating fiber according to the present invention can suppress its polarization mode dispersion to 0.5 ps·km$^{-\frac{1}{2}}$ or less when the out-of-roundness is 0.5% or less, for example.

FIG. 2 is a view showing a configurational example of an optical transmission system to which the dispersion-compensating fiber according to the present invention is applied. In this optical transmission system, one end (entrance end) of a dispersion-shifted fiber 200 to be compensated for is optically connected to a transmitter 400 by way of an optical fiber transmission line 300 such as a single-mode optical fiber, whereas the other end (exit end) thereof is optically connected to one end (entrance end) of the dispersion-compensating fiber 100 according to the present invention. On the other hand, the other end (exit end) of the dispersion-compensating fiber 100 is optically connected to a receiver 500 by way of an optical fiber transmission line 300 such as a single-mode optical fiber.

Here, the total dispersion and total dispersion slope in the optical transmission system to which the dispersion-compensating fiber 100 is applied are defined as follows. Namely, the total dispersion of the optical transmission system constituted, as shown in FIG. 2, by the dispersion-shifted fiber 200 with a length of $L_{DSF}$ having a dispersion $D_{DSF}$ (17 ps/nm/km at a wavelength of 1.55 μm) and a dispersion slope $S_{DSF}$ (0.06 ps/nm$^2$/km) and the dispersion-compensating fiber 100 with a length of $L_{DCF}$ having a dispersion $D_{DCF}$ and a dispersion slope $S_{DCF}$ is given by:

$$D_{DSF} \cdot L_{DSF} + D_{DCF} \cdot L_{DCF}$$

Also, the total dispersion slope in the optical transmission system is given by:

$$(S_{DSF} \cdot L_{DSF} + S_{DCF} \cdot L_{DCF})/L_{DSF}$$

Here, since the length of the dispersion-compensating fiber 100 is much shorter than that of the transmission line portion constituted by the dispersion-compensating fiber 100 and the dispersion-shifted fiber 200, its contribution to the total dispersion and total dispersion slope in the optical transmission system is negligible.

The dispersion-compensating fiber according to the present invention has such characteristics that, in the optical transmission system to which it is applied together with the dispersion-shifted fiber, the value of total dispersion slope becomes −0.024 ps/nm$^2$/km or more but 0.024 ps/nm$^2$/km or less under the condition where its dispersion is sufficiently compensated for with respect to light having a wavelength of 1.55 μm, i.e., under the condition where the total dispersion becomes zero.

The basis for this numerical range of total dispersion slope is as follows. Namely, in the case of WDM transmission with a signal bandwidth of 30 nm and a transmission length of 300 km, a difference of 216 ps/nm occurs between both ends of the signal band (the shortest and longest wavelengths in the signal band) when the total dispersion slope is 0.024 ps/nm$^2$/km. A permissible dispersion width of transmission limits in such optical transmission is described, for example, in "Optical Fiber Communication (OFC'96) Technical digest Postdeadline paper PD 19 (1996)"; and, according to its description, the limit of permissible dispersion width is about 200 ps/nm when the bandwidth is 32.4 nm in the optical transmission over 150 km of a single-mode optical fiber. In view of this, for carrying out wide-band, high-speed WDM transmission in an optical fiber transmission line having a length of 150 km or more, it is necessary that the total dispersion slope of the optical transmission line be −0.024 ps/nm$^2$/km or more but 0.024 ps/nm$^2$/km or less.

Further, when a dispersion-compensating fiber which is adapted to yield a total dispersion slope value of −0.012 ps/nm$^2$/km or more but 0.012 ps/nm$^2$/km or less is employed, an optical transmission system capable of higher-speed optical transmission can be realized. Namely, the total dispersion slope value is needed to be made further smaller in high-speed optical transmission at 20 Gbits/sec or at 30 Gbits/sec. According to the description in "Optical Fiber Communication (OFC'96) Technical digest Postdeadline paper PD 19 (1996)," optical transmission over a distance up to about 500 to 600 km is possible when the total dispersion slope is −0.012 ps/nm$^2$/km or more but 0.012 ps/nm$^2$/km or less.

Here, in order to constitute the optical transmission system as mentioned above, the length $L_{DCF}$ of the dispersion-compensating fiber is set so as to satisfy the following condition with respect to light having a wavelength λm in signal wavelengths within the wavelength band in use:

$$|D_{DSF}(\lambda m) \cdot L_{DSF} + D_{DCF}(\lambda m) \cdot L_{DCF}| \leq 200 \text{ ps/nm}$$

where $D_{DSF}(\lambda m)$ is the dispersion of the dispersion-shifted fiber at the wavelength λm;

$L_{DSF}$ is the length of the dispersion-shifted fiber;

$D_{DCF}(\lambda m)$ is the dispersion of the dispersion-compensating fiber at the wavelength $\lambda_m$; and $L_{DCF}$ is the length of the dispersion-compensating fiber.

More preferably, the length $L_{DCF}$ of the dispersion-compensating fiber is set so as to satisfy, with respect to all signal wavelengths $\lambda_{all}$ of light within the wavelength band in use, the following condition:

$$|D_{DSF}(\lambda_{all}) \cdot L_{DSF} + D_{DCF}(\lambda_{all}) \cdot L_{DCF}| \leq 200 \text{ ps/nm}$$

where $D_{DSF}(\lambda_{all})$ is the dispersion of the dispersion-shifted fiber at all the wavelengths $\lambda_{all}$ in use;

$L_{DSF}$ is the length of the dispersion-shifted fiber;

$D_{DCF}(\lambda_{all})$ is the dispersion of the dispersion-compensating fiber at all the wavelengths $\lambda_{all}$ in use; and $L_{DCF}$ is the length of the dispersion-compensating fiber.

The dispersion compensation ratio, which is employed as an index for evaluating the dispersion-compensating fiber together with the above-mentioned total dispersion slope value, will now be explained. In this specification, the dispersion compensation ratio of the dispersion-compensating fiber for compensating for the dispersion-shifted fiber is defined as the value obtained when the ratio of the dispersion slope of the dispersion-compensating fiber to the dispersion slope of the dispersion-shifted fiber at a wavelength of 1.55 μm is divided by the ratio of the dispersion of the dispersion-compensating fiber to the dispersion of the dispersion-shifted fiber at a wavelength of 1.55 μm, and represents, when an optical transmission system is constituted by the dispersion-shifted fiber and the dispersion-compensating fiber, the correlation between the total dispersion and total dispersion slope in the optical transmission system. Namely, letting $D_{DSF}$ be the dispersion of the dispersion-shifted fiber, $S_{DSF}$ be the dispersion slope thereof, $D_{DCF}$ be the dispersion of the dispersion-compensating fiber, and $S_{DCF}$ be the dispersion slope thereof, the dispersion compensation ratio DSCR is given by:

$$DSCR = (S_{DCF}/D_{DCF})/(S_{DSF}/D_{DSF})$$

For example, in an optical transmission system having a dispersion compensation ratio of 100%, the ratio in length between the dispersion-shifted fiber and the dispersion-compensating fiber is set such that the total dispersion becomes zero, whereby the total dispersion slope value becomes 0 ps/nm$^2$/km simultaneously, thus completely compensating for the total dispersion and total dispersion slope at the same time. In an optical transmission system having a dispersion compensation ratio of 50%, for example, which is not greater than 100%, on the other hand, the total dispersion slope can be compensated for by only 50% even if the ratio in length between the dispersion-shifted fiber and the dispersion-compensating fiber is set such that the total dispersion becomes zero. In this case, if the dispersion slope of the dispersion-shifted fiber is 0.07 ps/nm$^2$/km, then the total dispersion slope after the compensation becomes 0.035 ps/nm$^2$/km. In an optical transmission system having a dispersion compensation ratio of 150%, for example, which is not lower than 100%, in contrast, the total dispersion slope can be compensated for in excess by 50% even if the ratio in length between the dispersion-shifted fiber and the dispersion-compensating fiber is set such that its total dispersion becomes zero. In this case, if the dispersion slope of the dispersion-shifted fiber is 0.07 ps/nm$^2$/km, then the total dispersion slope after the compensation becomes −0.035 ps/nm$^2$/km.

With regard to the optical transmission system to which the dispersion-compensating fiber according to the present invention is applied, the condition for the total dispersion slope to become −0.024 ps/nm$^2$/km or more but 0.024 ps/nm$^2$/km or less corresponds to, for example, the state where the dispersion compensation ratio is about 66% or more but 134% or less in the case where the dispersion-compensating fiber is connected to the dispersion-shifted fiber whose dispersion slope is 0.07 ps/nm$^2$/km. Similarly, the condition for the total dispersion slope of −0.012 ps/nm$^2$/km or more but 0.012 ps/nm$^2$/km or less corresponds to the state where the dispersion compensation ratio is about 83% or more but 117% or less.

The configuration of such an optical transmission system is not limited to that mentioned above. For example, though the dispersion-compensating fiber 100 is arranged downstream from the dispersion-shifted fiber 200 in FIG. 2, it may be located upstream from the dispersion-shifted fiber 200. Also, the optical transmission line of the optical transmission system shown in FIG. 2 may be an optical transmission line network capable of bidirectional communications. As the optical fiber transmission line 300, not only a single-mode optical fiber but also other modes of optical fibers may be employed as required. If necessary, repeaters and the like can be installed on the transmission line.

Specific embodiments of the dispersion-compensating fiber according to the present invention and their characteristics will now be explained. Here, all of various characteristics such as dispersion and dispersion slope in each of the embodiments set forth in the following are based on results of calculations employing a finite-element method.

(First Embodiment)

The cross-sectional structure of the dispersion-compensating fiber according to the first embodiment and its refractive index profile are similar to the cross-sectional structure shown in FIG. 1A and the refractive index profile shown in FIG. 1B, respectively. Prepared as the dispersion-compensating fiber according to the first embodiment were four kinds of samples in which the relative refractive index difference $\Delta_1$ of the core 1 with respect to the third cladding 4, the relative refractive index difference $\Delta_2$ of the first cladding 2 with respect to the third cladding 4, the relative refractive index difference $\Delta_3$ of the second cladding 3 with respect to the third cladding 4, and the ratio 2a/2b of the outside diameter 2a of the core 1 to the outside diameter 2b of the first cladding 2 were fixed at 1.1%, −0.7%, 0.08%, and 0.42%, respectively, whereas the respective values of the ratio 2a/2c of the outside diameter 2a of the core 1 to the outside diameter 2c of the second cladding 3 were (a) 0.10, (b) 0.13, (c) 0.15, and (d) 0.20. Here, the relative refractive index differences $\Delta_1$, $\Delta_2$, and $\Delta_3$, and 2a/2b mentioned above satisfy the individual conditions (1), (2), (3), (6), and (7) mentioned above, whereas 2a/2b mentioned above satisfies condition (4).

Figure 3A:
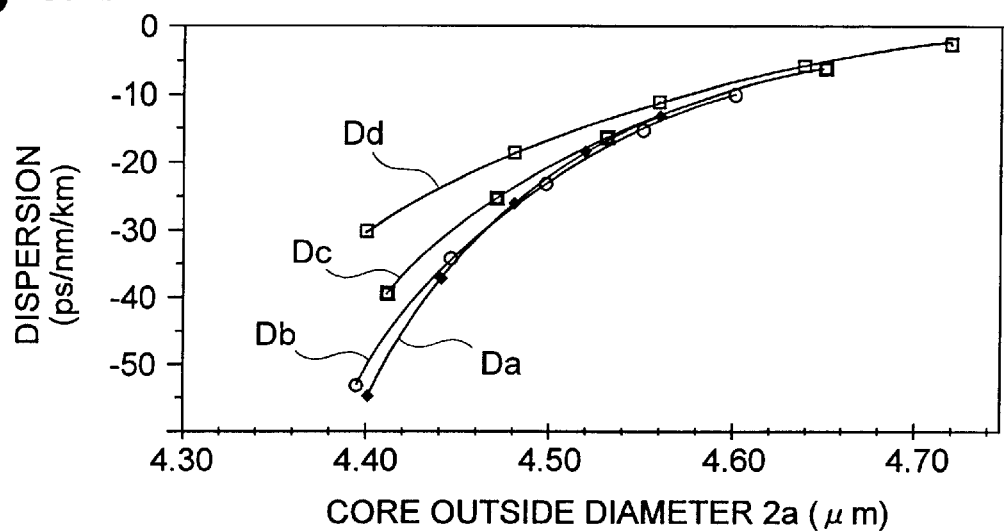
FIGS. 3A to 3C are graphs showing dependence characteristics of dispersion, dispersion slope, and bending loss at a diameter of 60 mm upon core outside diameter in a first embodiment of the dispersion-compensating fiber according to the present invention, respectively.
Figure 3B:
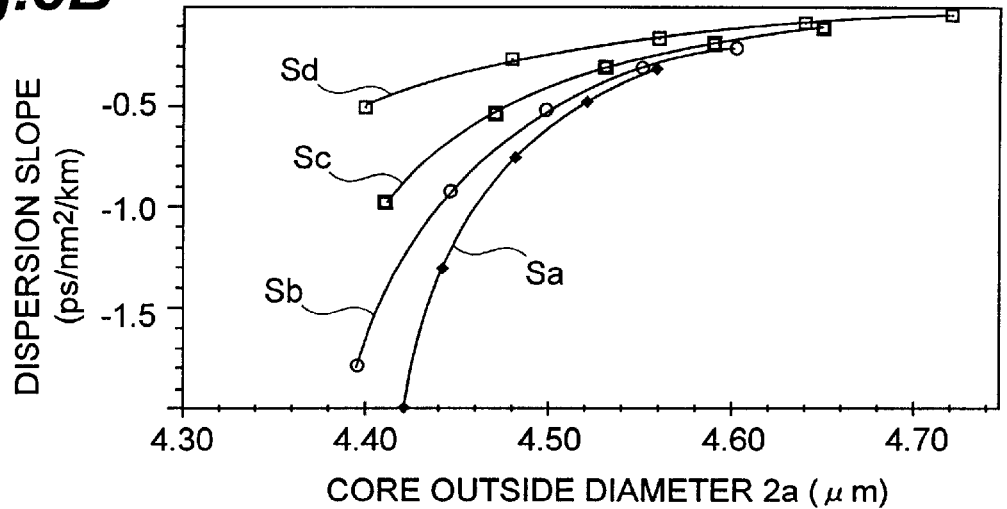
Figure 3C:
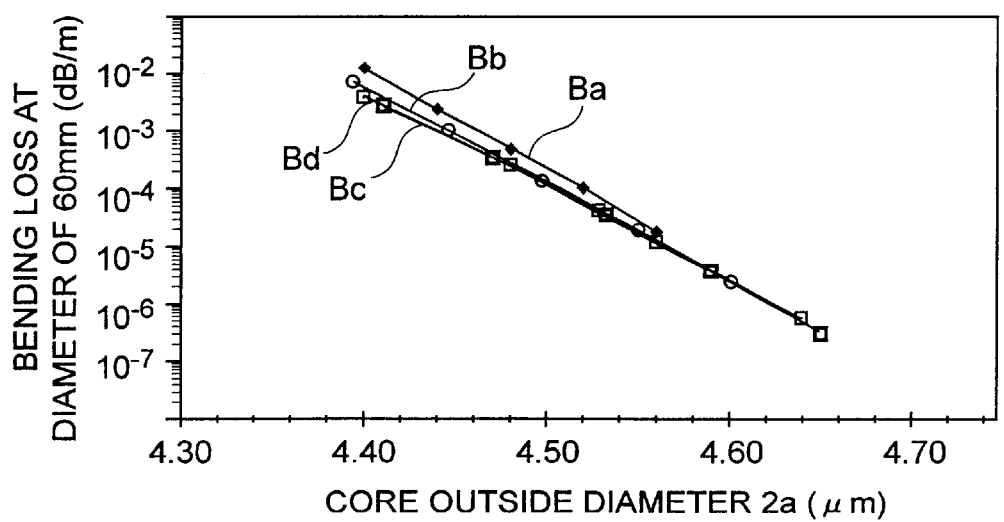

FIGS. 3A to 3C are graphs showing the dispersion (Da to Dd), dispersion slope (Sa to Sd), and bending loss at a diameter of 60 mm (Ba to Bd) for each value of 2a/2c with respect to light having a wavelength of 1.55 μm. Here, suffixes a to d correspond to the respective values (a) to (d) of 2a/2c. Each abscissa indicates the outside diameter 2a of the core 1, and the bending loss is a small value of about 10$^{-2}$ dB/m or less within the calculated range. Also, the dispersion and the dispersion slope are within the range of about −50 to 0 ps/nm/km and the range of about −2.0 to 0 ps/nm$^2$/km, respectively.

Figure 4:
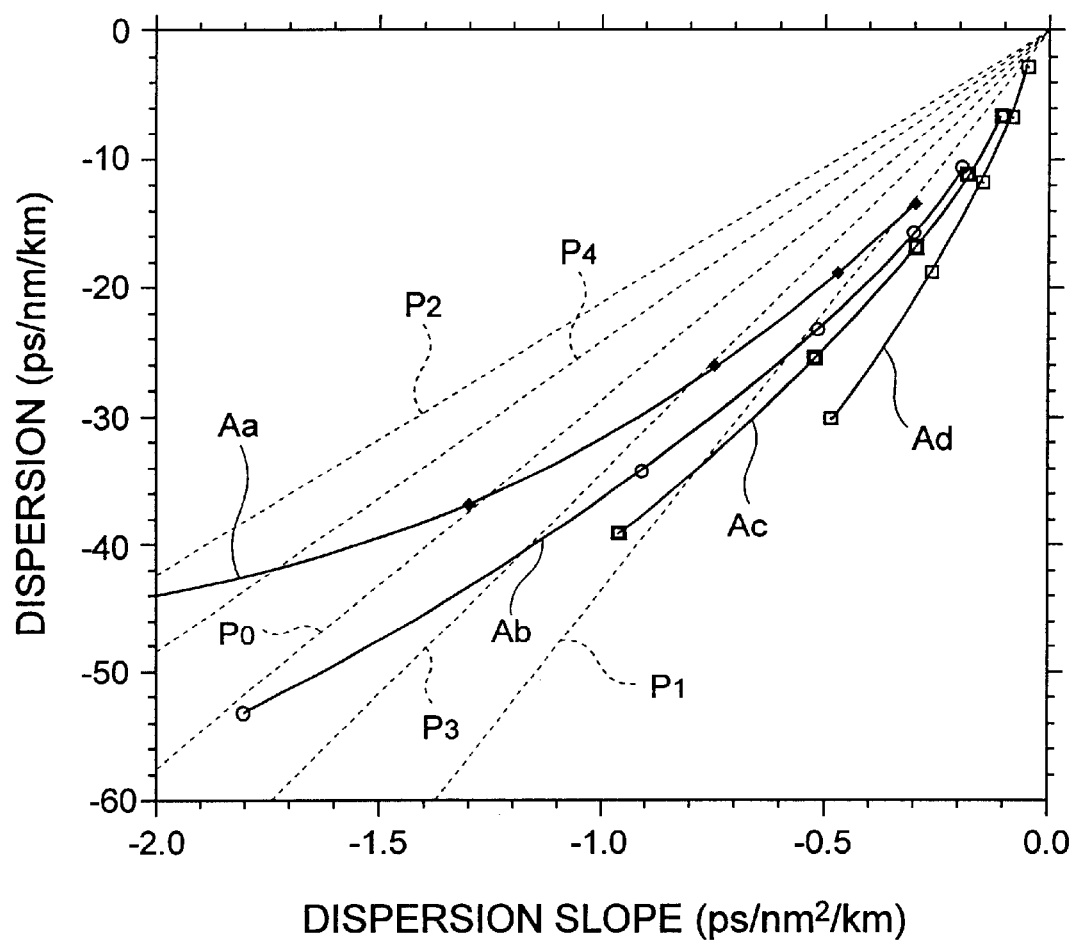
FIG. 4 is a graph showing relationships between dispersion and dispersion slope in the dispersion-compensating fiber according to the first embodiment.

Relationships between the dispersion and dispersion slope are indicated by Aa to Ad in FIG. 4. In the graph of FIG. 4, dotted lines P0 to P4 indicate dispersion compensation ratios in the case where connection to a dispersion-shifted fiber having a dispersion of 2 ps/nm/km and a dispersion slope of 0.07 ps/nm$^2$/km at a wavelength of 1.55 μm is assumed. Dotted line P0 indicates the case where the dispersion compensation ratio is 100%, and corresponds to the state where the dispersion is completely compensated for and the total dispersion slope is 0 ps/nm$^2$/km. Dotted lines P1 and P2 indicate the cases where the dispersion compensation ratio is about 66% and 134%, respectively, and similarly correspond to the states where the total dispersion slope is 0.024 and −0.024 ps/nm$^2$/km, respectively. Dotted lines P3 and P4 indicate the cases where the dispersion compensation ratio is about 83% and 117%, respectively, and correspond to the states where the total dispersion slope is 0.012 and −0.012 ps/nm$^2$/km, respectively. From these relationships, it can be seen that the case (a) where the value of 2a/2c is 0.10 is the most preferable as the dispersion-compensating fiber of this embodiment. Namely, in the case where the relative refractive index difference $\Delta_3$ of the second cladding 3 with respect to the third cladding 4 is 0.08%, a dispersion-compensating fiber which can effectively restrain bending loss from increasing is obtained when the outside diameter 2c of the second cladding 3 is enhanced.

(Second Embodiment)

As with the first embodiment, the second embodiment has the structure and refractive index profile shown in FIGS. 1A and 1B. Prepared as the dispersion-compensating fiber according to the second embodiment were three kinds of samples in which the relative refractive index difference $\Delta_1$ of the core 1 with respect to the third cladding 4, the relative refractive index difference $\Delta_2$ of the first cladding 2 with respect to the third cladding 4, the relative refractive index difference $\Delta_3$ of the second cladding 3 with respect to the third cladding 4, and the ratio 2b/2c of the outside diameter 2b of the first cladding 2 to the outside diameter 2c of the second cladding 3 were fixed at 2.5%, −0.7%, 0.08%, and 0.44%, respectively, whereas the respective values of the ratio 2a/2b of the outside diameter 2a of the core 1 to the outside diameter 2b of the first cladding 2 were (a) 0.25, (b) 0.34, and (c) 0.41. Here, the relative refractive index differences $\Delta_1$, $\Delta_2$, and $\Delta_3$, and 2b/2c mentioned above satisfy the individual conditions (1), (2), (3), and (8) mentioned above, whereas each of the three kinds of 2a/2b mentioned above satisfies conditions (4) and (6).

Figure 5A:
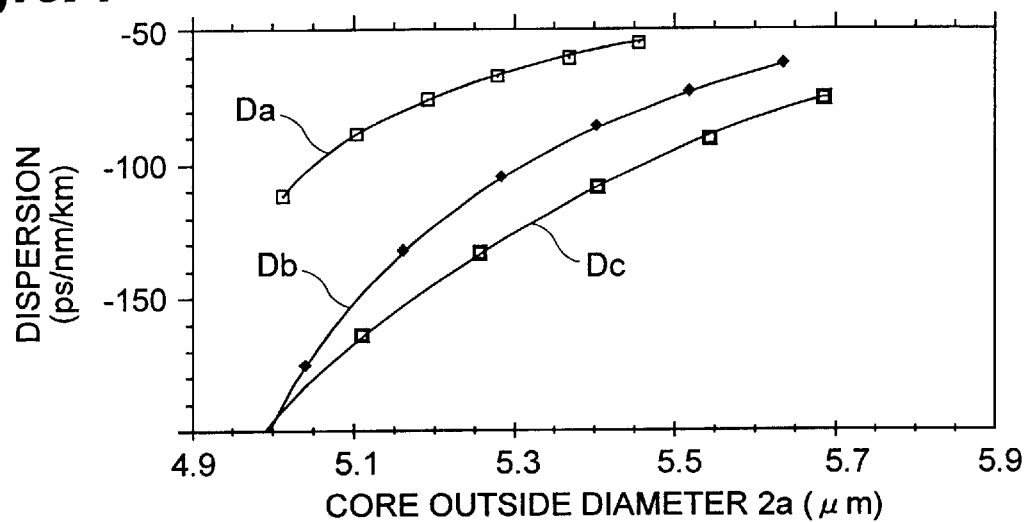
FIGS. 5A to 5C are graphs showing dependence characteristics of dispersion, dispersion slope, and bending loss at a diameter of 60 mm upon core outside diameter in a second embodiment of the dispersion-compensating fiber according to the present invention, respectively.
Figure 5B:
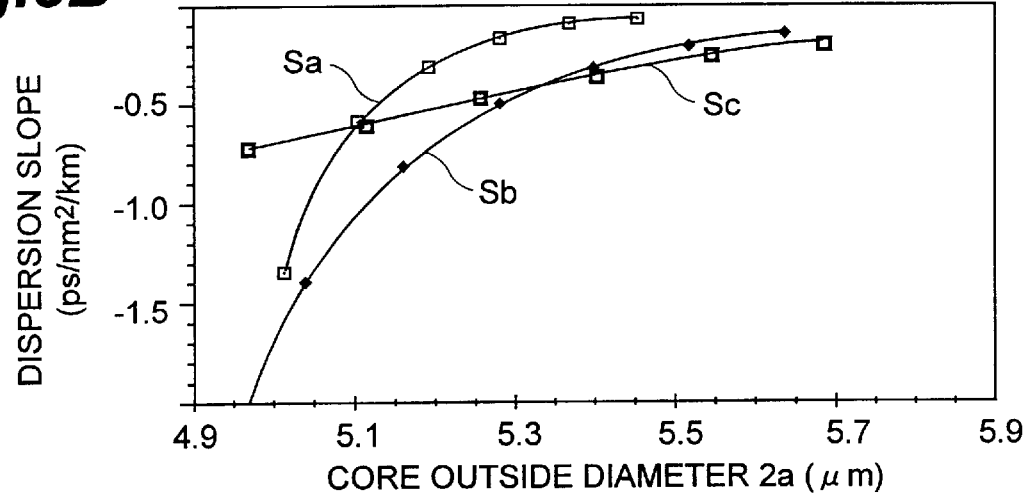
Figure 5C:
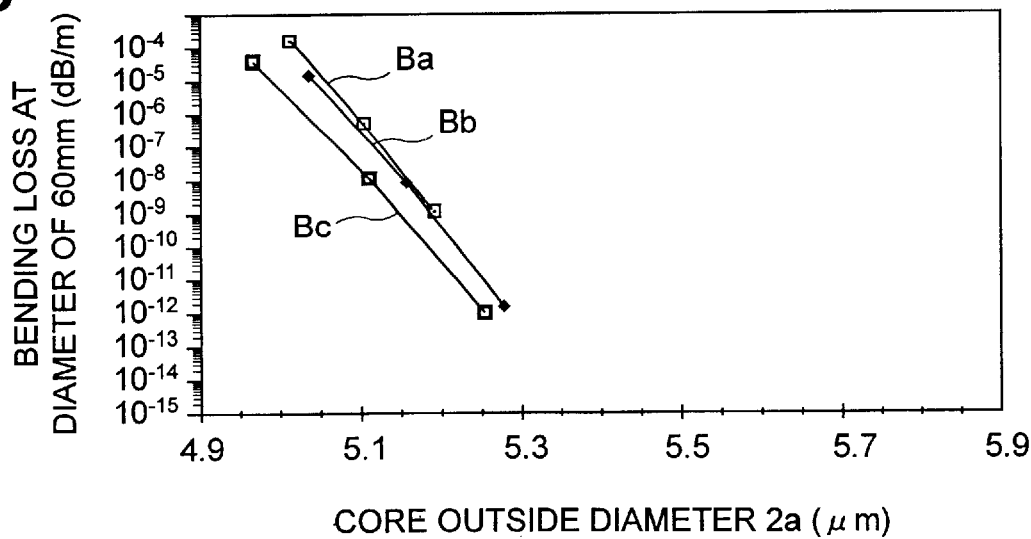

FIGS. 5A to 5C are graphs showing the dispersion (Da to Dc), dispersion slope (Sa to Sc), and bending loss at a diameter of 60 mm (Ba to Bc) for each value of 2a/2b with respect to light having a wavelength of 1.55 μm. Here, suffixes a to c correspond to the respective values (a) to (c) of 2b/2c. Each abscissa indicates the outside diameter 2a of the core 1, and the bending loss is a small value of about $10^{-4}$ dB/m or less within the calculated range. Also, the dispersion and the dispersion slope are within the range of about −200 to −50 ps/nm/km and the range of about −2.0 to 0 ps/nm$^2$/km, respectively.

Figure 6:
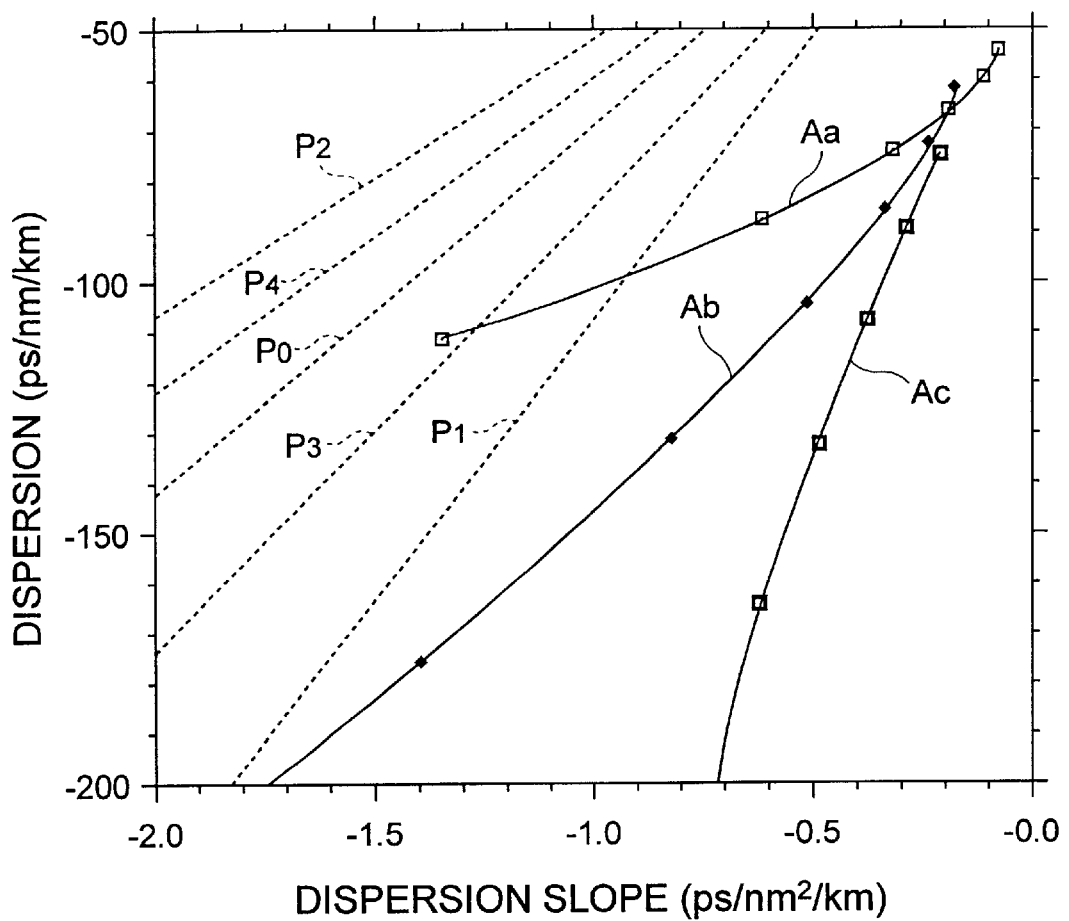
FIG. 6 is a graph showing relationships between dispersion and dispersion slope in the dispersion-compensating fiber according to the second embodiment.

Relationships between the dispersion and dispersion slope are indicated by Aa to Ac in FIG. 6. In the graph of FIG. 6, dotted lines P0 to P4 indicate dispersion compensation ratios in the case where connection to a dispersion-shifted fiber having a dispersion of 5 ps/nm/km and a dispersion slope of 0.07 ps/nm$^2$/km at a wavelength of 1.55 μm is assumed. The dispersion compensation ratio and total dispersion slope corresponding to each dotted line are similar to those in the graph of FIG. 4. From these relationships, it can be seen that the case (a) where the value of 2a/2c is 0.25 is the most preferable as the dispersion-compensating fiber of this embodiment.

Here, although the above-mentioned first embodiment is an example in which the relative refractive index difference $\Delta_1$ of the core 1 with respect to the third cladding 4 is 1.1% and thus satisfies condition (7): $1\% \leq \Delta_1 \leq 2\%$, the relative refractive index difference $\Delta_1$ (2.5%) in the second embodiment satisfies condition (8): $2\% \leq \Delta_1 \leq 3\%$. Here, while the dispersion is within the range of −50 to 0 ps/nm/km in the first embodiment, it is within the range of −200 to −50 ps/nm/km in the second embodiment, whereby the absolute value of dispersion is enhanced as the relative refractive index difference $\Delta_1$ is made greater. While the same holds true for other parameters as well, various characteristics of the dispersion-compensating fiber largely depend on these parameters concerning the refractive index and outside diameter as can be seen when the first and second embodiments are compared with each other, whereby it is important that the individual parameters be optimized so as to yield characteristics corresponding to the use of the dispersion-compensating fiber or necessary conditions.

(Third Embodiment)

As with the first and second embodiments, the third embodiment has the structure and refractive index profile shown in FIGS. 1A and 1B. Prepared as the dispersion-compensating fiber according to the third embodiment were a plurality of samples in which the relative refractive index difference $\Delta_1$ of the core 1 with respect to the third cladding 4, the relative refractive index difference $\Delta_3$ of the second cladding 3 with respect to the third cladding 4, the ratio 2a/2b of the outside diameter 2a of the core 1 to the outside diameter 2b of the first cladding, the ratio 2a/2c of the outside diameter 2a of the core 1 to the outside diameter 2c of the second cladding 3 were fixed at 1.4%, 0.4%, 0.4, and 0.27, respectively, whereas the relative refractive index difference $\Delta_2$ of the first cladding with respect to the third cladding 4 was within the range of −0.8% to −0.3%. Here, the relative refractive index differences $\Delta_1$ and $\Delta_3$, 2a/2b, and 2a/2c mentioned above satisfy the individual conditions (1), (2), (4), (5), (6), and (7) mentioned above, whereas the above-mentioned relative refractive index difference $\Delta_2$ satisfies condition (3) except for a sample in which it is −0.3%.

Figure 7:
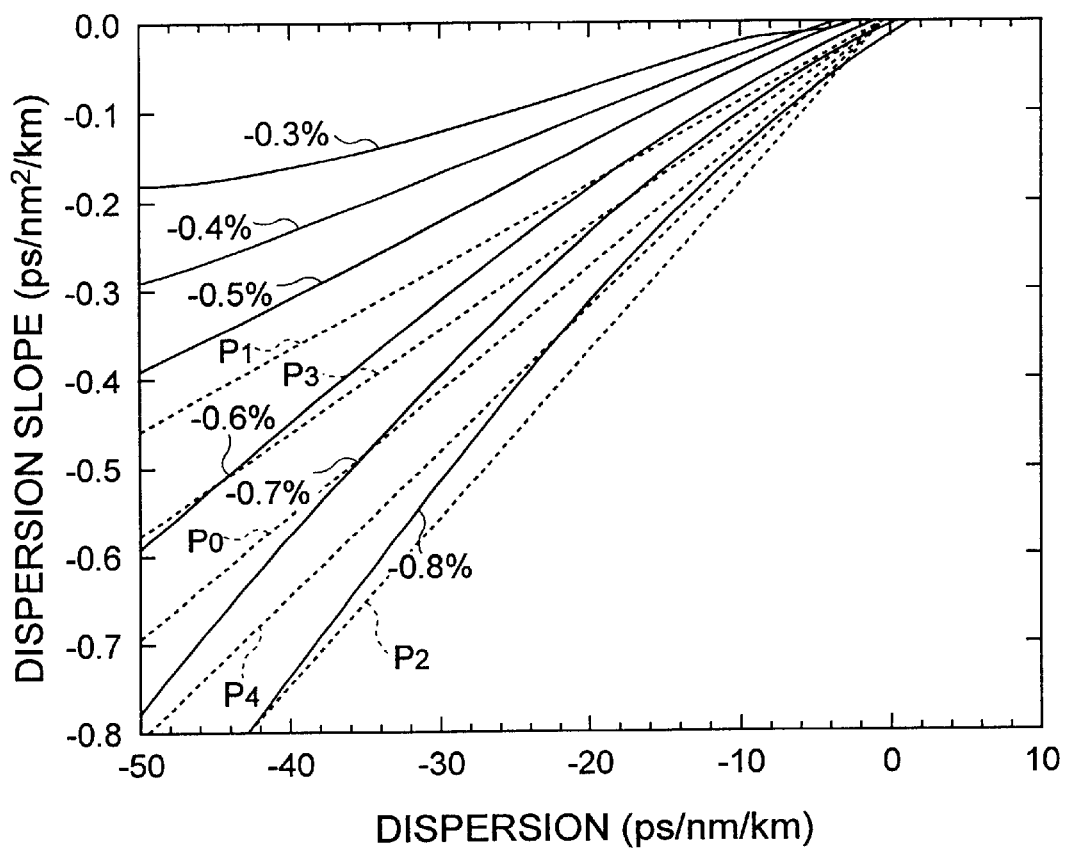
FIG. 7 is a graph showing relationships between dispersion and dispersion slope in a third embodiment of the dispersion-compensating fiber according to the present invention.

Relationships between the dispersion and dispersion slope of the dispersion-compensating fiber according to the third embodiment are shown in the graph of FIG. 7. In this graph, dotted lines P0 to P4 indicate dispersion compensation ratios in the case where connection to a dispersion-shifted fiber having a dispersion of 5 ps/nm/km and a dispersion slope of 0.07 ps/nm$^2$/km at a wavelength of 1.55 μm is assumed. The values of dispersion compensation ratio and total dispersion slope corresponding to each dotted line are similar to those in the graph of FIG. 4. As can also be seen from this graph, the absolute value of the dispersion slope with respect to a given dispersion value becomes greater as the absolute value of $\Delta_2$ increases (−0.8%, −0.7%, −0.3%) and, if $\Delta_2$ is set in the vicinity of −0.7%, approaches doted line P0 which indicates a dispersion compensation ratio of 100%, thereby making it possible to compensate for the dispersion slope in a wide range of dispersion value at the same time as well.

FIGS. 8A to 8E are graphs showing the total dispersion slope, dispersion, bending loss at a diameter of 20 mm, effective area $A_{eff}$, and cutoff wavelength with respect to light having a wavelength of 1.55 μm when $\Delta_2 = -0.7\%$ as a preferable value, respectively. In each graph, the abscissa indicates the outside diameter 2a of the core 1. Here, while the total dispersion slope is a value obtained under the condition where the dispersion at a wavelength of 1.55 μm is completely compensated for with respect to the dispersion-shifted fiber having the above-mentioned dispersion and dispersion slope, the absolute value of total dispersion slope is suppressed to 0.012 ps/nm$^2$/km or less over a very wide range where the outside diameter 2a of the core 1 is about 4.84 to 5.13 μm. Here, the absolute value of total dispersion slope was 0.024 ps/nm$^2$/km or less over the whole calculated range.

Figure 8A:
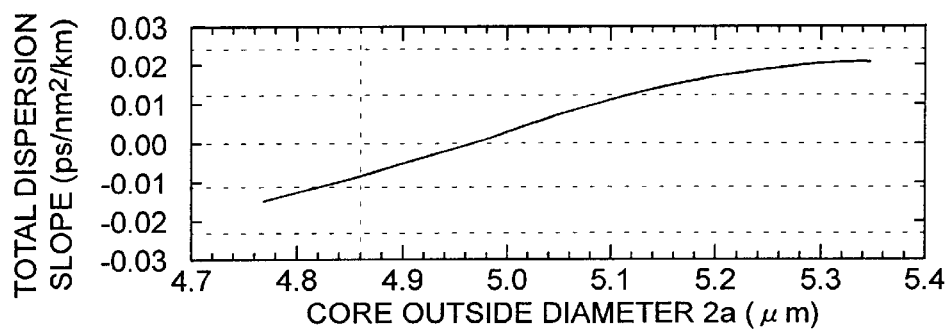
FIGS. 8A to 8E are graphs showing dependence characteristics of total dispersion slope, dispersion, bending loss at a diameter of 20 mm, effective area ($A_{eff}$), and cutoff wavelength on core outside diameter in the dispersion-compensating fiber according to the third embodiment, respectively.
Figure 8B:
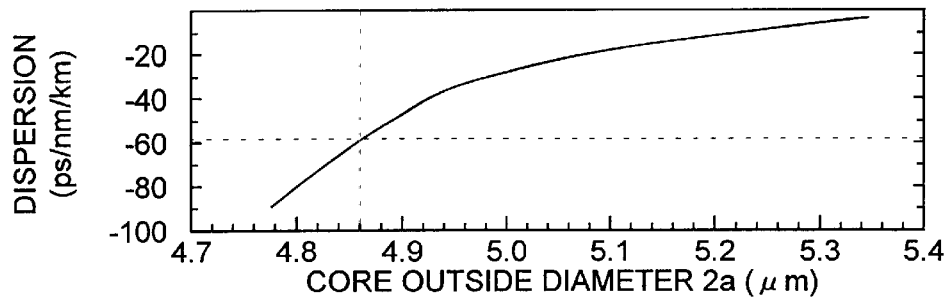
Figure 8C:
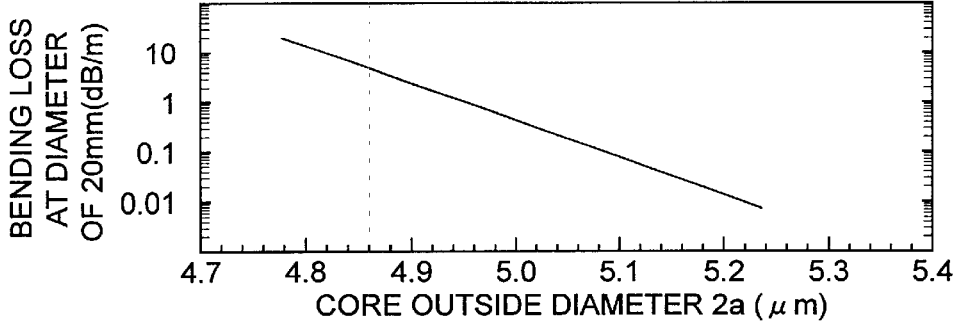
Figure 8D:
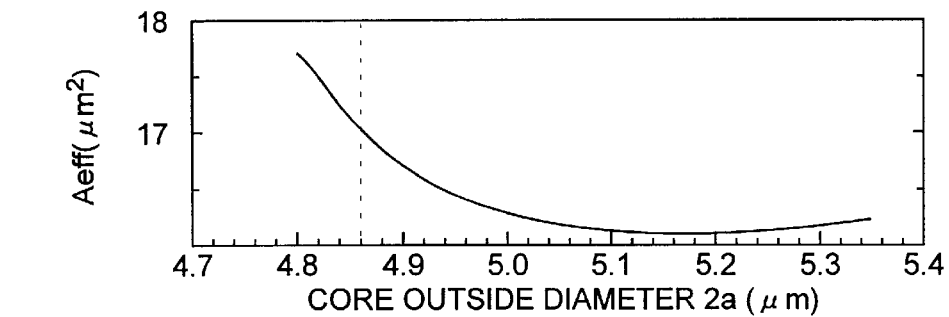
Figure 8E:
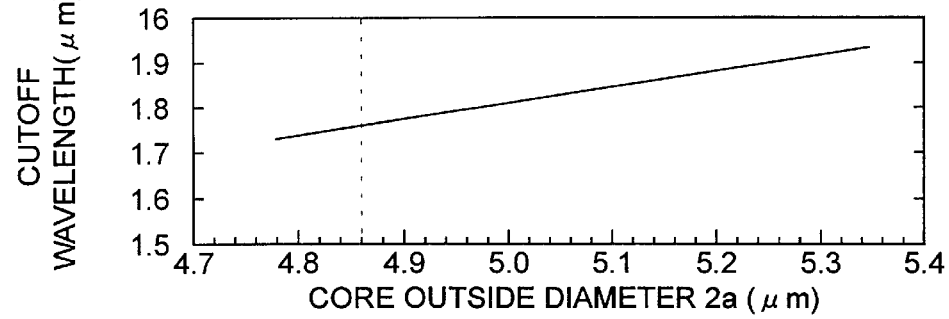

There are cases where the dispersion-compensating fiber is used as a module in a state accommodated within a predetermined container while being wound like a coil. Therefore, it is necessary to take account of the bending loss of the dispersion-compensating fiber. Here, letting the upper limit of bending loss at a diameter of 20 mm be 5 dB/m, the lower limit of the outside diameter 2a of the core is 4.86 μm as can also be seen from the graph of FIG. 8C. Further, in order to decrease the necessary fiber length by enhancing the dispersion compensation efficiency of the dispersion-compensating fiber, it is important that the absolute value of the dispersion having a negative value be made greater. In the third embodiment, a dispersion as large as about −60 ps/nm/km can be achieved as indicated in the graph of FIG. 8B. Consequently, the necessary fiber length of the dispersion-compensating fiber can become about 1/10 of the dispersion-shifted fiber transmission line.

As for the bending loss, though the value of bending loss at a diameter of 20 mm is indicated in the explanation of the third embodiment, the bending loss at a diameter of 60 mm becomes a value smaller than that at the diameter of 20 mm.

In the case of the dispersion-compensating fiber according to the third embodiment, the effective area Aeff is about 17 μm (see FIG. 8D), thus being on a par with that of the current dispersion-compensating fiber. Also, the cutoff wavelength of the second-order mode at a fiber length of 2 m is about 1.8 μm (see FIG. 8E). Here, though the single mode is not guaranteed at the fiber length of 2 m in this embodiment, the single mode is guaranteed in actual uses since there exists a sufficient fiber length due to the distance dependence of cutoff wavelength.

(Fourth Embodiment)

In an optical transmission line including a dispersion-shifted fiber of a 1.55-μm wavelength band, there are cases where it is necessary to carry out WDM transmission of a 1.58-μm wavelength band in order to suppress nonlinear effects, and the dispersion-compensating fiber according to the present invention is also applicable to such cases.

Figure 9:
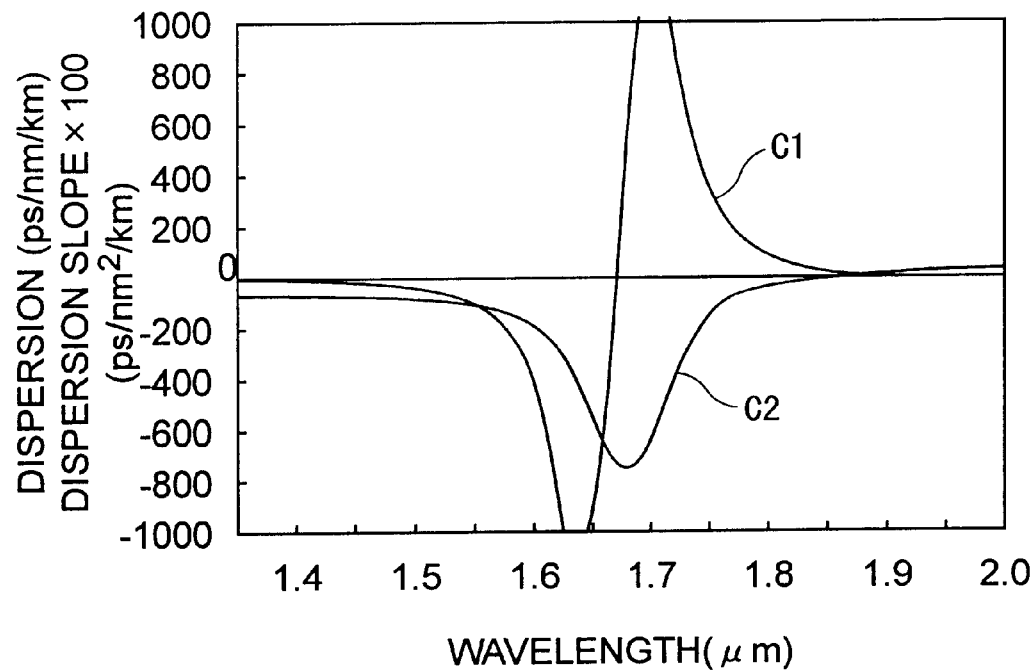
FIG. 9 is a graph showing relationships between dispersion and dispersion slope in a fourth embodiment of the dispersion-compensating fiber according to the present invention.

FIG. 9 is a graph showing an example of the wavelength dependence of the dispersion and dispersion slope in the fourth embodiment of the dispersion-compensating fiber according to the present invention. Here, C1 indicates the curve of dispersion slope, whereas C2 indicates the curve of dispersion. If the minimum value of dispersion is appropriately selected, a large dispersion slope can be obtained, for example, in a region with a large absolute value of dispersion on the order of −150 to −300 ps/nm/km. Though such a region is susceptible to bending loss, in the case of a dispersion-shifted fiber having a dispersion on the order of 1.5 to 3.0 ps/nm/km with respect to light in the 1.58-$\mu$m wavelength band, the dispersion and dispersion slope of the dispersion-shifted fiber having a length of about 80 km can be compensated for by a length of less than 1 km. Therefore, while the minimum diameter of the module (in which the dispersion-compensating fiber is wound like a coil) is set greater and the refractive index of the second cladding 3 is made greater, so as to yield a structure resistant to bending, the distance dependence of the cutoff wavelength $\lambda c$ is employed, whereby a practically usable dispersion-compensating fiber is obtained.

Figure 10:
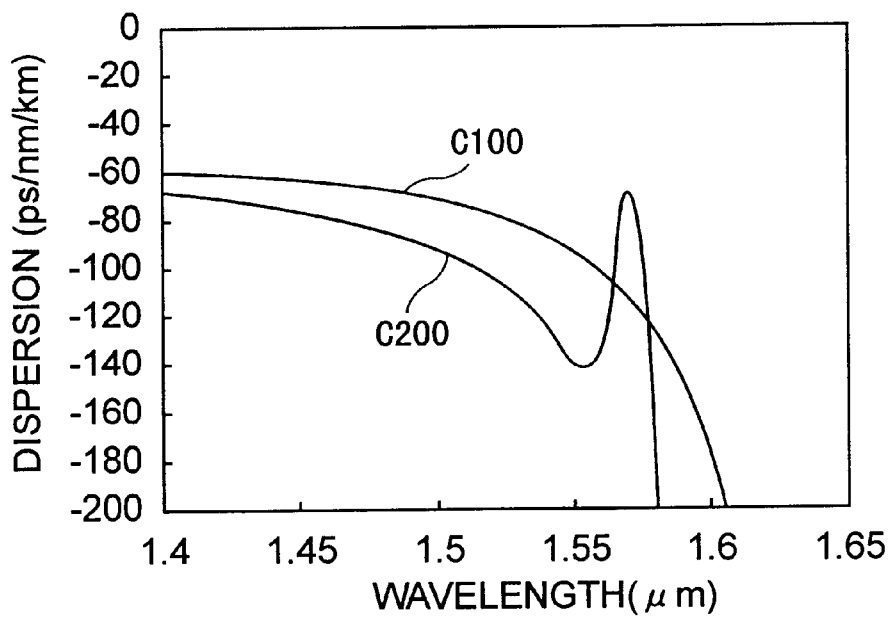
FIG. 10 is a graph for comparing the dispersion of the dispersion-compensating fiber according to the fourth embodiment and the dispersion of a dispersion-compensating fiber (comparative example) having a double cladding structure.

FIG. 10 is a graph showing an example of wavelength dependence of the dispersion in a dispersion-compensating fiber having a triple cladding structure (indicated by C100 in the graph) and the dispersion in a dispersion-compensating fiber having a double cladding structure (indicated by C200 in the graph) which is a comparative example. While the dispersion in the dispersion-compensating fiber of double cladding structure has a minimum value near the base cutoff wavelength (wavelength to become a maximum), no base cutoff wavelength is seen in the dispersion-compensating fiber of triple cladding structure, whereby a large negative dispersion value can be realized.

Figure 11:
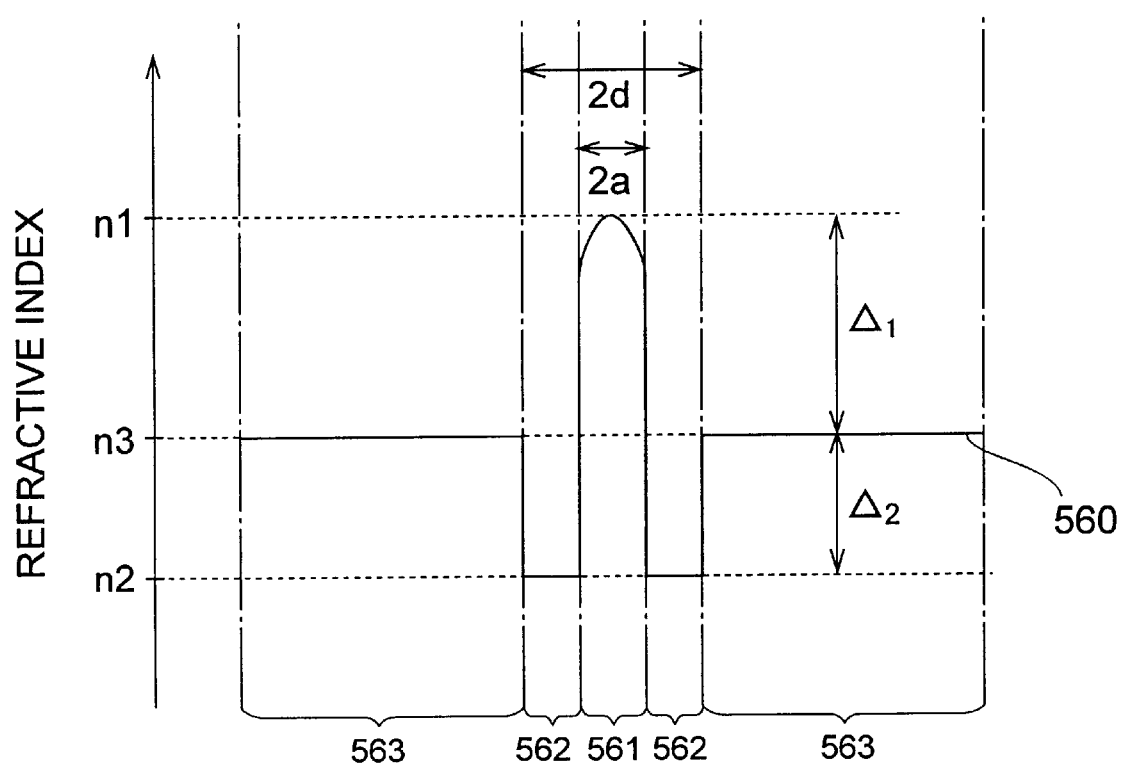
FIG. 11 is a chart showing the refractive index profile of the comparative example (dispersion-compensating fiber) having a double cladding structure.

Here, FIG. 11 shows the refractive index profile 560 of the dispersion-compensating fiber of double cladding structure, which is a comparative example, and the dispersion-compensating fiber of the comparative example corresponds to a structure in which the second cladding 3 (corresponding to the area 30) is excluded from the triple cladding structure shown in FIG. 1A (i.e., 2$d$=2$b$). Consequently, in the refractive index profile 560 of FIG. 11, areas 561, 562, and 563 indicate the refractive indices of the core portion, first cladding portion, and second cladding portion corresponding to the individual parts on the line L of the core 1, first cladding 2, and third cladding 4 shown in FIG. 1A, respectively. Hence, the dispersion-compensating fiber as the comparative example comprises the core portion having a refractive index $n_1$ and an outside diameter 2$a$; the first cladding portion provided on the outer periphery of the core portion and having a refractive index $n_2$ (<$n_1$) and an outside diameter 2$d$; and the second cladding portion provided on the outer periphery of the first cladding portion and having a refractive index $n_3$ (>$n_2$, and <$n_1$). Also, $\Delta_1$ shown in FIG. 11 is the relative refractive index difference of the core portion with respect to the above-mentioned second cladding portion, whereas $\Delta_2$ is the relative refractive index difference of the first cladding portion with respect to the above-mentioned second cladding portion.

Figure 12:
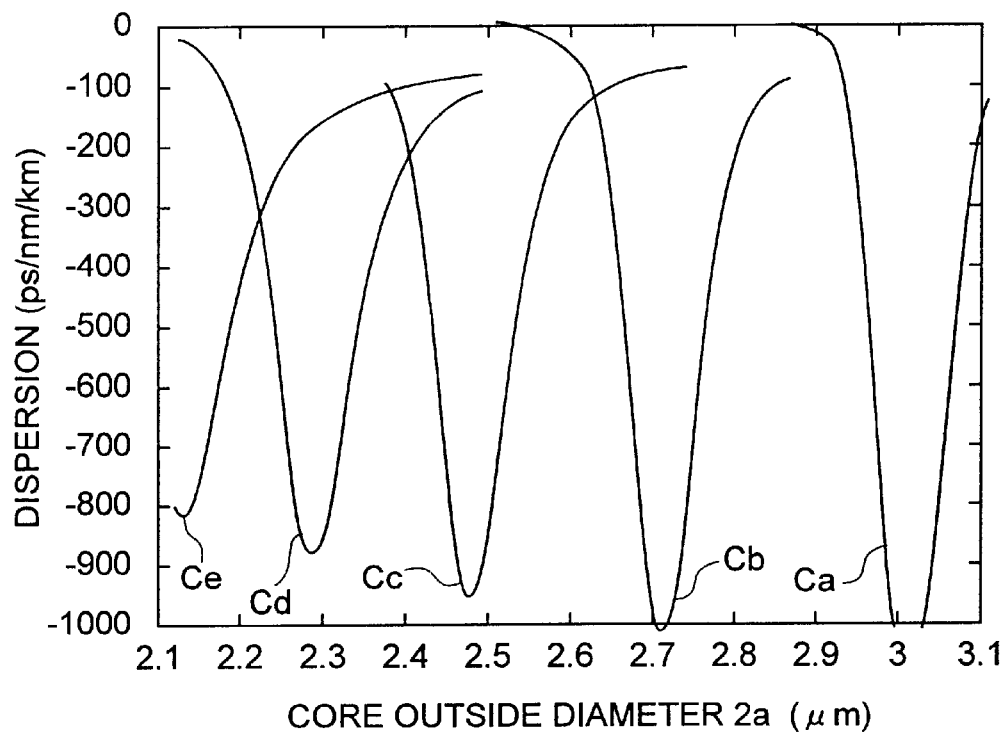
FIG. 12 is a graph showing relationships between dispersion and core outside diameter when $\Delta_1$ is changed in the dispersion-compensating fiber according to the fourth embodiment.
Figure 13:
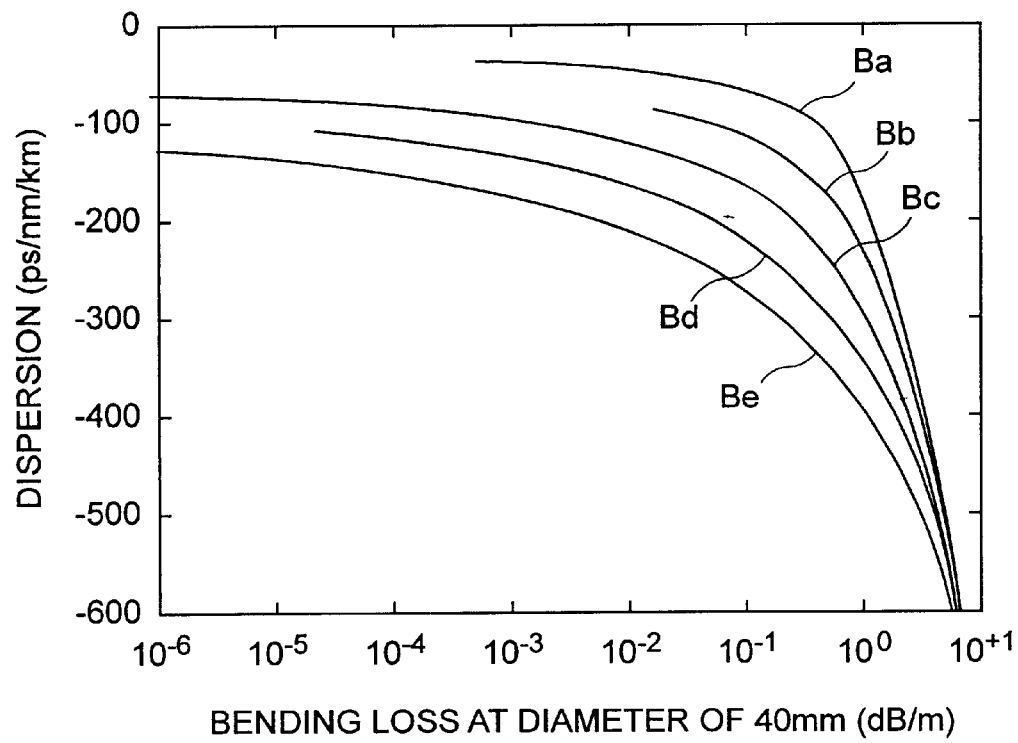
FIG. 13 is a graph showing relationships between dispersion and bending loss at a diameter of 40 mm when $\Delta_1$ is changed in the dispersion-compensating fiber according to the fourth embodiment.

Curves Ca to Ce in FIG. 12 indicate relationships between the dispersion and the core outside diameter 2$a$ in the case where the value of $\Delta_1$ is changed, whereas curves Ba to Be in FIG. 13 indicate relationships between the dispersion and the bending loss at a diameter of 40 mm in the case where the value of $\Delta_1$ is changed. Suffixes a to e in these graphs correspond to respective cases where $\Delta_1$ is set to (a) 1.83, (b) 2.13, (c) 2.42, (d) 2.71, and (e) 2.99, whereas $\Delta_2$, $\Delta_3$, 2$a$/2$c$, and 2$a$/2$b$ are fixed at −0.67%, 0.147%, 0.125, 0.25, and 0.5 in each case, respectively.

When the relative refractive index difference $\Delta_1$ is set low, the negative peak value of dispersion can be made greater, whereby a large dispersion slope can be obtained in a larger area of the core outside diameter 2$a$ from the peak. From the viewpoint of bending loss, on the other hand, it is desirable that $\Delta_1$ be higher with respect to the same dispersion value. Balancing these opposite effects, an optimal value of $\Delta_1$ can be derived.

Figure 14:
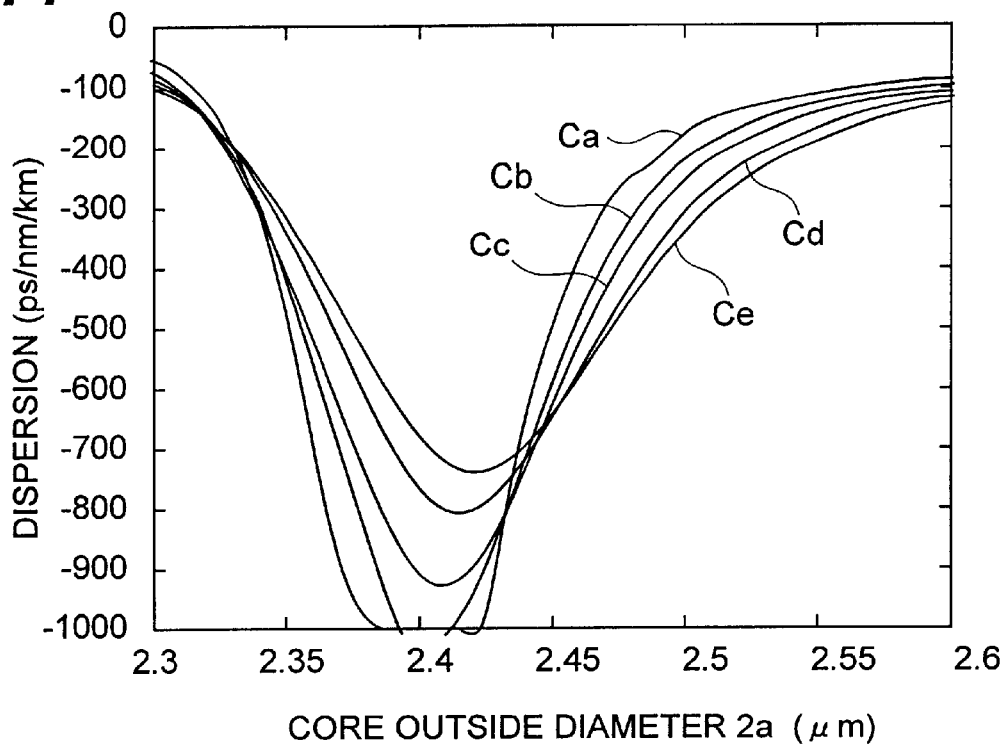
FIG. 14 is a graph showing relationships between dispersion and core outside diameter when $2a/2b$ is changed in the dispersion-compensating fiber according to the fourth embodiment.
Figure 15:
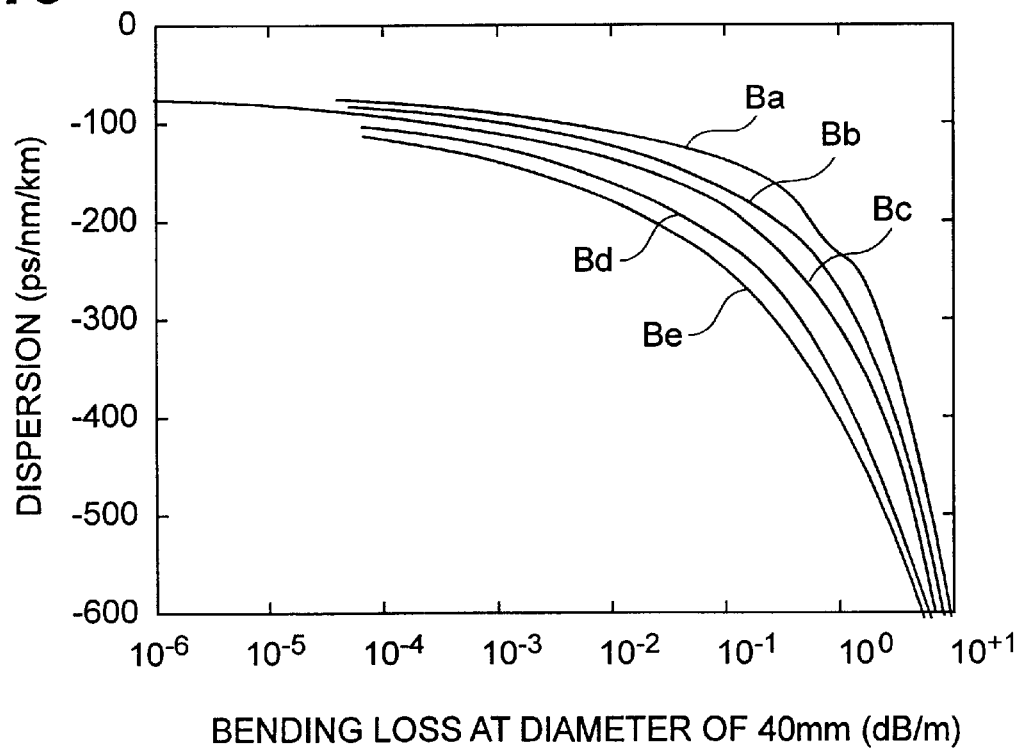
FIG. 15 is a graph showing relationships between dispersion and bending loss at a diameter of 40 mm when $2a/2b$ is changed in the dispersion-compensating fiber according to the fourth embodiment.

Curves Ca to Ce in FIG. 14 indicate relationships between the dispersion and the outer core diameter 2$a$ in the case where the value of 2$a$/2$b$ is changed, whereas curves Ba to Be in FIG. 15 indicate relationships between the dispersion and the bending loss at a diameter of 40 mm in the case where the value of 2$a$/2$b$ is changed. Suffixes a to e in these graphs correspond to respective cases where 2$a$/2$b$ is set to (a) 0.231, (b) 0.242, (c) 0.250, (d) 0.263, and (e) 0.273, whereas $\Delta_1$, $\Delta_2$, $\Delta_3$, and 2$a$/2$c$ are fixed at 2.51%, −0.67%, 0.147%, and 0.125 in each case, respectively.

In particular, while the negative peak value of dispersion can be increased when 2$a$/2$b$ is made smaller, its effect is opposite to the bending loss as in the case where the refractive index $\Delta_1$ is changed.

Figure 16:
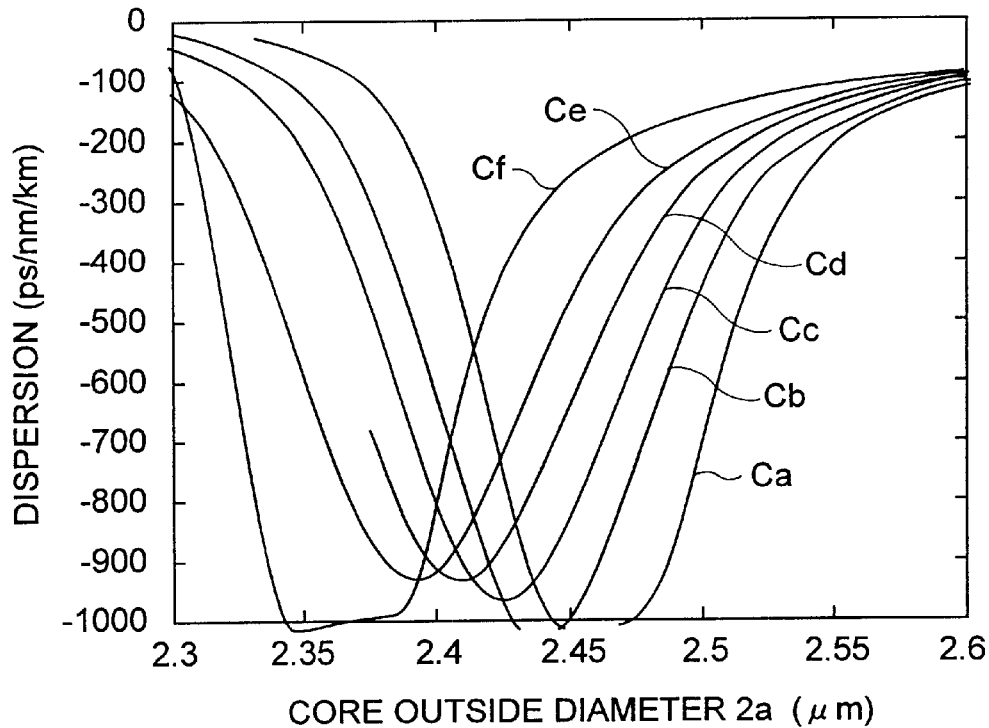
FIG. 16 is a graph showing relationships between dispersion and core outside diameter when $2a/2c$ is changed in the dispersion-compensating fiber according to the fourth embodiment.
Figure 17:
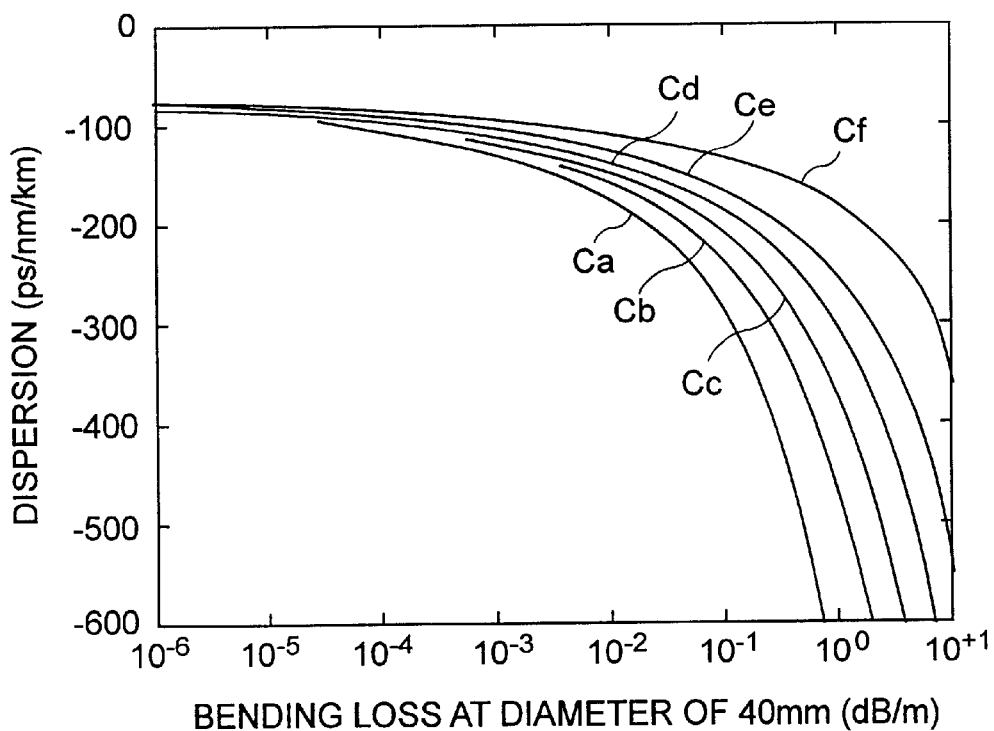
FIG. 17 is a graph showing relationships between dispersion and bending loss at a diameter of 40 mm when $2a/2c$ is changed in the dispersion-compensating fiber according to the fourth embodiment.

Further, curves Ca to Cf in FIG. 16 indicate relationships between the dispersion and the outer core diameter 2$a$ in the case where the value of 2$a$/2$c$ is changed, whereas curves Ba to Bf in FIG. 17 indicate relationships between the dispersion and the bending loss at a diameter of 40 mm in the case where the value of 2$a$/2$c$ is changed. Suffixes a to f in these graphs correspond to respective cases where 2$a$/2$c$ is set to (a) 0.101, (b) 0.110, (c) 0.117, (d) 0.125, (e) 0.133, and (f) 0.156, whereas $\Delta_1$, $\Delta_2$, $\Delta_3$ and 2$a$/2$b$ are fixed at 2.51%, −0.67%, 0.147%, and 0.25 in each case, respectively.

In both of respective cases where 2$a$/2$c$ is enhanced and reduced, the negative peak value of dispersion tends to increase. In view of the dependence of bending loss on the dispersion value, on the other hand, the effect of improving the bending loss is greater when 2$a$/2$c$ is smaller, whereby it is desirable that the value of 2$a$/2$c$ be smaller. Here, it is necessary that an appropriate value be selected such that the cutoff wavelength $\lambda c$ does not become too long.

Figure 18A:
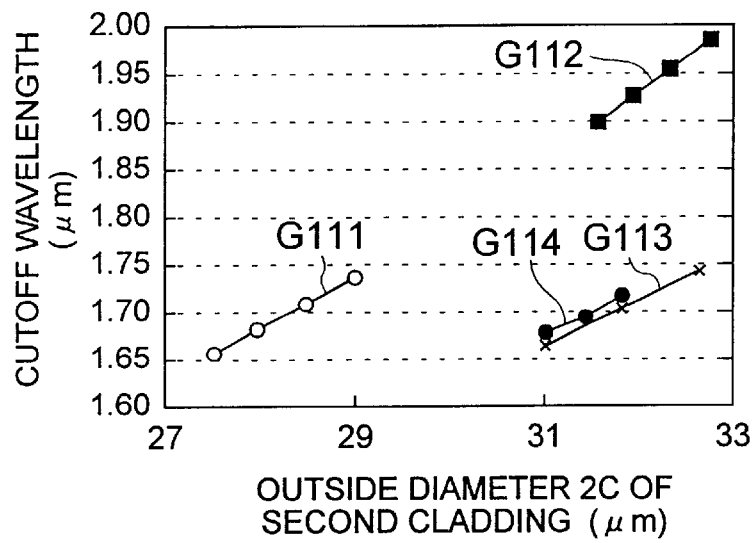
FIGS. 18A to 18C are graphs showing relationships between the cutoff wavelength and the outside diameter of the second cladding, between the dispersion compensation rate (DSCR) and the outside diameter of the second cladding, and between the DSCR and the cutoff wavelength, respectively.
Figure 18B:
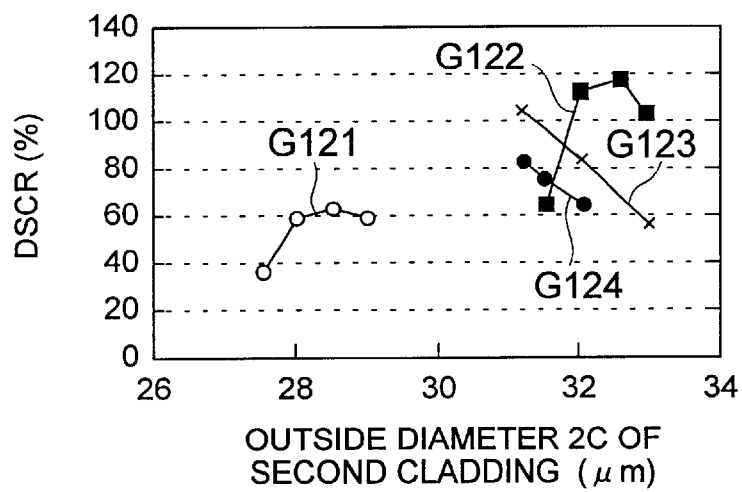
Figure 18C:
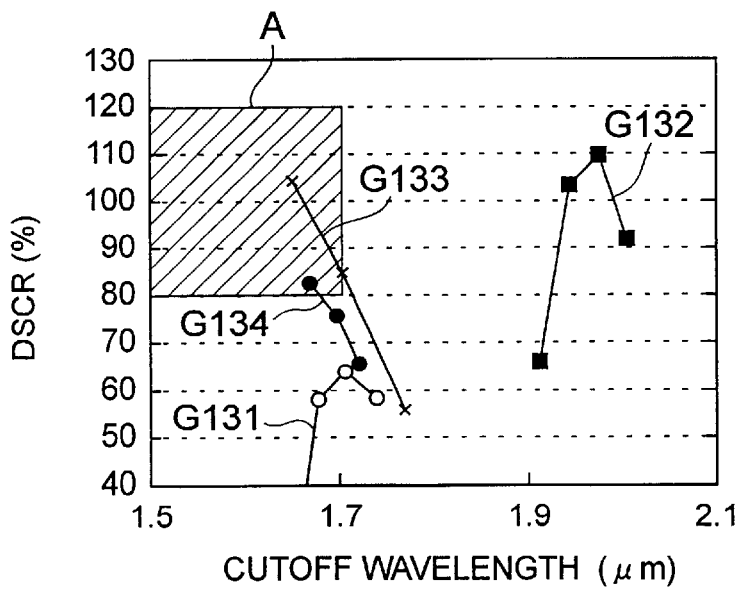

FIGS. 18A to 18C indicate the assessment result regarding to the prepared some samples. FIG. 18A shows the relationship between the cutoff wavelength ($\mu$m) and the outside diameter 2$c$ ($\mu$m) of the second cladding. In FIG. 18A, the graph G111 is directed to a first sample having $\Delta_1$ of 2.0%, $\Delta_2$ of −0.52% and $\Delta_3$ of 0.31%, the graph G112 is directed to a second sample having $\Delta_1$ of 2.4%, $\Delta_2$ of −0.52% and $\Delta_3$ of 0.31%, the graph G113 is directed to a third sample having $\Delta_1$ of 2.0%, $\Delta_2$ of −0.58% and $\Delta_3$ of 0.25%, and the graph G114 is directed to a fourth sample having $\Delta_1$ of 2.0%, $\Delta_2$ of −0.52% and $\Delta_3$ of 0.25%. Also, in the first to fourth samples, 2$a$/2$c$ and 2$b$/2$c$ are fixed to 0.1 and 0.25, respectively. FIG. 18B shows the relationship between the dispersion compensation ratio (DSCR:%) and the outside diameter 2$c$ ($\mu$m) of the second cladding. In FIG. 18B, the graphs G121, G122, G123 and G124 correspond to the above-mentioned first, second, third and fourth samples, respectively. Further, FIG. 18C shows the relationship between the DSCR (%) and the cutoff wavelength ($\mu$m), and is obtained by rearranging FIGS. 18A and 18B. In FIG. 18C, the graphs G131, G132, G133 and G134 correspond to the above-mentioned first, second, third and fourth samples, respectively. The area drawn with oblique lines in FIG. 18C indicates an actually usable range. In these assessment, a dispersion-shifted fiber, which has a dispersion of 4 ps/nm/km and a dispersion slope of 0.07 ps/nm²/km at a wavelength of 1550 nm, is prepared as a transmission line to be compared for.

Here, for insuring the single-mode operation of the samples, the upper limit of each cutoff wavelength thereof is about 1.7 cm even if considering a distance dependency of the cutoff wavelength. Also, for achieving a high-speed transmission at a wider wavelength band, it is preferable that the DSCR is 80–120%. The samples having $\Delta_3$ of 0.31% hardly satisfies these conditions. In contrast, it is clear that $\Delta_3$ is preferably set to 0.25% or less for satisfying theses conditions.

As can be understood from FIGS. 18A to 18C, since the value of 2a/2c is small, the volume of the core region to be doped with a high-volume $GeO_2$ can be reduced, and whereby the dispersion-shifted fiber according to the present invention can be characterized by having a structure suitable for mass- and low cost-manufacturing. Further, since the volume of 2b/2c can become small, the volume of the region to be doped with F can be reduced, and also the fiber suitable for further mass- and low cost-manufacturing can be obtained.

Figure 19:
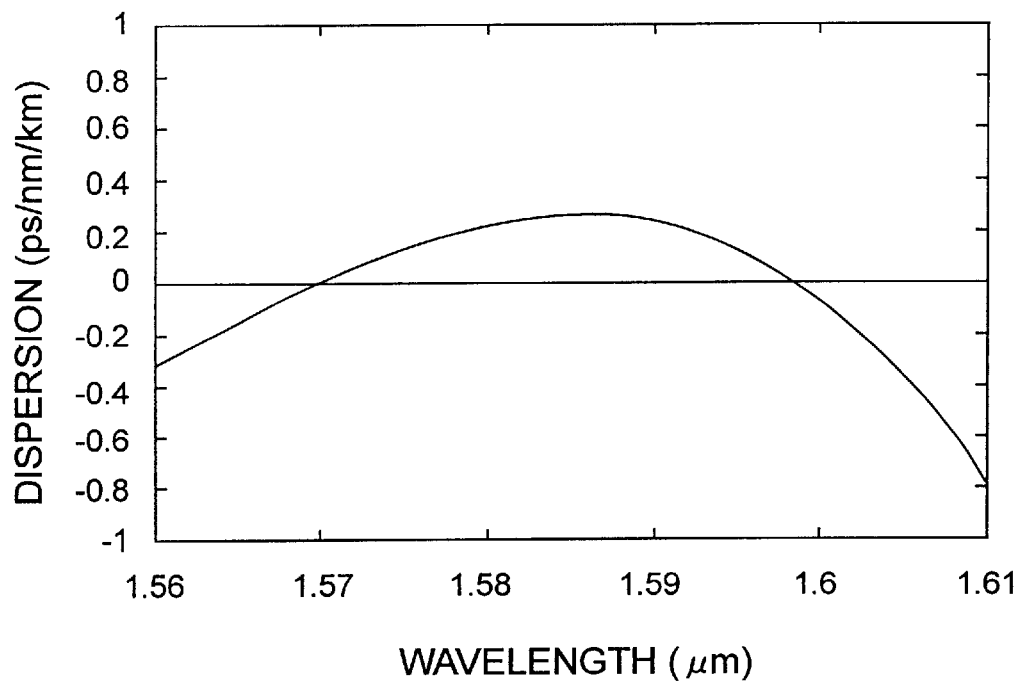
FIG. 19 is a (first) graph showing the wavelength dependence of the dispersion in an optical transmission system constituted by a dispersion-compensating fiber according to the present invention and a dispersion-shifted fiber.
Figure 20:
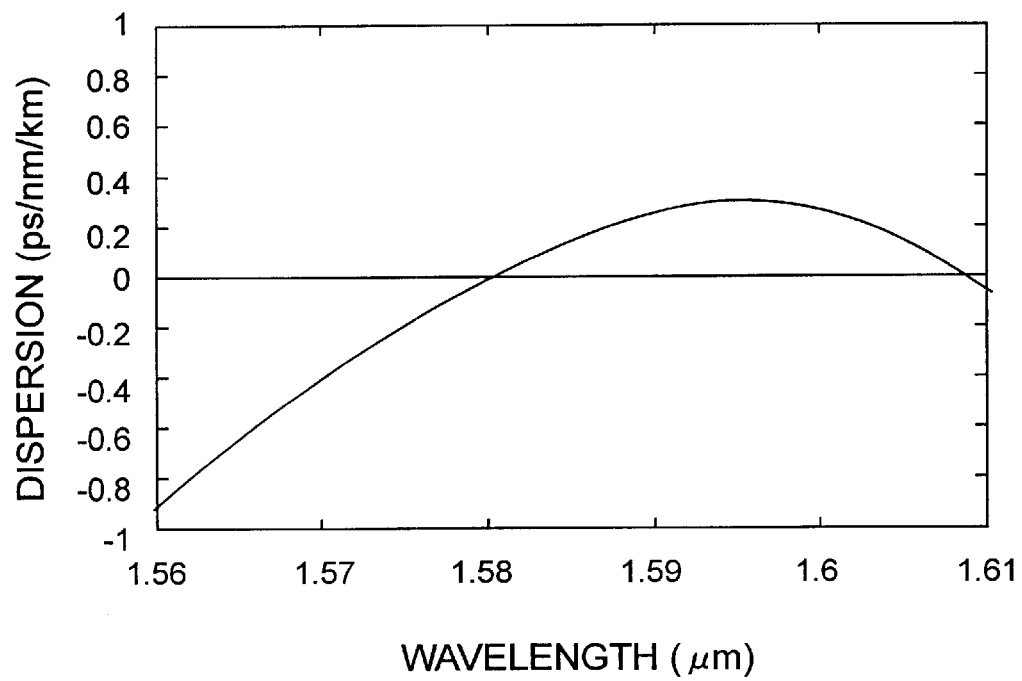
FIG. 20 is a (second) graph showing the wavelength dependence of the dispersion in an optical transmission system constituted by a dispersion-compensating fiber according to the present invention and a dispersion-shifted fiber.

FIGS. 19 and 20 show graphs indicating the wavelength dependence characteristics of optical transmission systems each comprising such a dispersion-compensating fiber and a dispersion-shifted fiber. As individual parameters of the dispersion-compensating fiber, $\Delta_1$, $\Delta_2$, $\Delta_3$, 2a/2c, 2a/2b, and 2b/2c are set to 2.51%, −0.67%, 0.147%, 0.11, 0.25, and 0.44, respectively. Also, a dispersion-shifted fiber having a zero-dispersion wavelength of 1.536 μm and a dispersion slope of 0.066 ps/nm²/km is assumed to be the object to be compensated for in the optical transmission system having the wavelength dependence of dispersion shown in FIG. 19, whereas a dispersion-shifted fiber having a zero-dispersion wavelength of 1.552 μm and a dispersion slope of 0.075 ps/nm²/km is assumed to be the object to be compensated for in the optical transmission system having the wavelength dependence of dispersion shown in FIG. 20. In any case, a low dispersion value is realized within the wavelength range of 1.57 to 1.60 μm.

Figure 21:
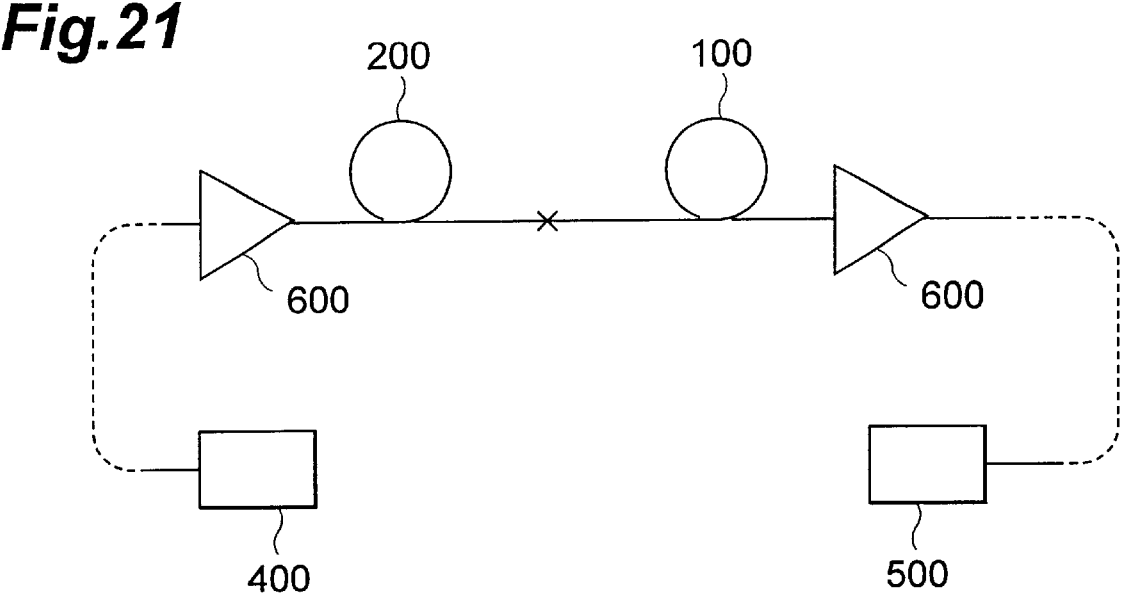
FIG. 21 is a view showing another configurational example of the optical transmission system to which the dispersion-compensating fiber according to the present invention is applied.
Figure 22:
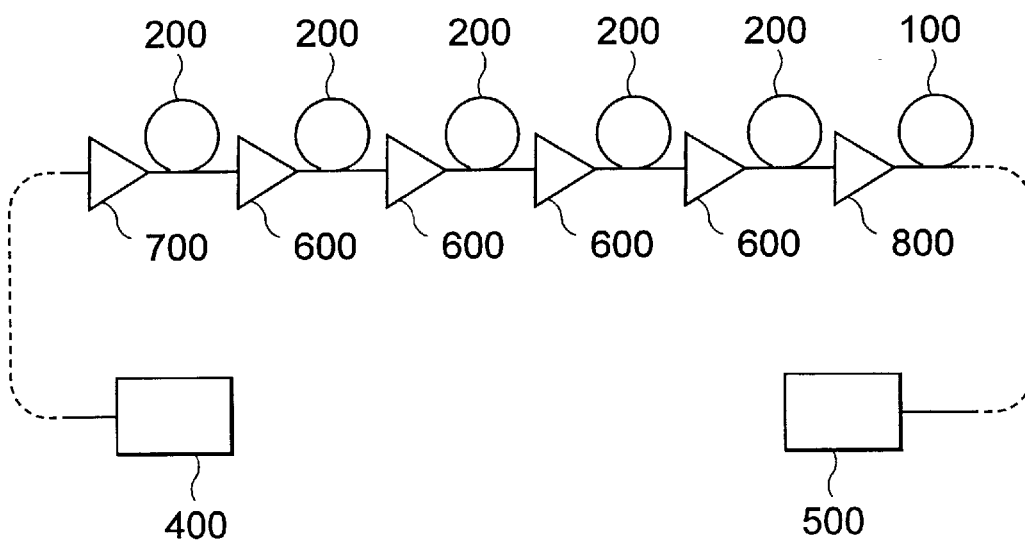
FIG. 22 is a view showing still another configurational example of the optical transmission system to which the dispersion-compensating fiber according to the present invention is applied.

FIGS. 21 and 22 show configurational examples of the optical transmission system for carrying out WDM transmission of a 1.58-μm wavelength band, to which a dispersion-compensating fiber and a dispersion-shifted fiber such as those mentioned above are applied. In the optical transmission system of FIG. 21, two repeating amplifiers 600 (EDFA: Erbium-doped fiber amplifier for the 1.58-μm wavelength band) are installed in a transmission line between a transmitter 400 and a receiver 500, whereas a dispersion-shifted fiber 200 having a length of 94 km and a dispersion-compensating fiber 100 having a length of 1 km for compensating for the dispersion and dispersion slope of the dispersion-shifted fiber 200 are installed between the repeating amplifiers 600.

In the optical transmission system of FIG. 22, on the other hand, a preamplifier 700 and a back-end amplifier 800 are installed in a transmission line between a transmitter 400 and a receiver 500, whereas a plurality of (four in the drawing) repeating amplifiers 600 are installed between the preamplifier 700 and the back-end amplifier 800. A dispersion-shifted fiber 200 having a length of 80 km is installed between each pair of the repeating amplifiers 600. On the other hand, a dispersion-compensating fiber 100 having a length of 4.8 km is installed between the back-end amplifier 800 and the receiver 500, so as to compensate for the dispersion and dispersion slope in the optical transmission system. In these optical transmission systems, a 1.56- to 1.61-μm eight-wave multiplexing transmitter, for example, is employed as the transmitter 400.

The length of each fiber and the like in the explanation of the optical transmission systems shown in FIGS. 21 and 22 are just examples thereof, and are set appropriately according to characteristics of the individual fibers so as to realize dispersion compensation and the like.

In the dispersion-compensating fiber according to the present invention, as explained in the foregoing, a triple cladding structure is employed in the dispersion-compensating fiber for carrying out the dispersion compensation for the dispersion-shifted fiber, and the refractive index and outer diameter of each part thereof are optimized, whereby the dispersion slope can also be sufficiently compensated for at the same time when dispersion compensation is carried out.

Also, since the relative refractive index difference $\Delta_1$ of the core portion and the like are set such that the absolute value of dispersion is sufficiently enhanced, the length of the dispersion-compensating fiber necessary for dispersion compensation (ratio of its length to that of the dispersion-shifted fiber to be compensated for) can be decreased, and the bending loss can be made sufficiently small. As a result, when the dispersion-compensating fiber is wound like a coil so as to construct a module, the latter can be made smaller, and efficient compensation of dispersion and dispersion slope can be realized.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A dispersion-compensating fiber for compensating for a dispersion of a predetermined length of a dispersion-shifted fiber having a zero-dispersion wavelength in a 1.5 μm wavelength band, comprising:

a core region extending along a predetermined reference axis and having a core with an outside diameter 2a; and a cladding region which is a region provided on the outer periphery of said core region, said cladding region having a first cladding provided on the outer periphery of said core and having an outside diameter 2b, a second cladding provided on the outer periphery of said first cladding and having an outside diameter 2c, and a third cladding provided on the outer periphery of said second cladding, wherein a refractive index $n_1$ of said core region, a refractive index $n_2$ of said first cladding, a refractive index $n_3$ of said second cladding, and a refractive index $n_4$ of said third cladding satisfy the following condition:

$$n_1 > n_3 > n_4 > n_2;$$

wherein, at a wavelength of 1.55 μm, a dispersion D and a dispersion slope S of said dispersion-compensating fiber satisfy the following condition:

$$D \leq -50 \text{ ps/nm/km,}$$

and $$S/D \geq 0.01 \text{ 1/nm.}$$

2. A dispersion-compensating fiber according to claim 1, wherein, at the wavelength of 1.55 μm, said dispersion-compensating fiber has the dispersion D of −200 ps/nm/km or more.

3. A dispersion-compensating fiber according to claim 2, wherein, at the wavelength of 1.55 μm, said dispersion-compensating fiber has the dispersion D of −100 ps/nm/km or less.

4. A dispersion-compensating fiber according to claim 2, wherein a relative refractive index difference $\Delta_1$ of said core region with respect to said third cladding satisfies the following condition:

$$2\% \leq \Delta_1 \leq 3\%.$$

5. A dispersion-compensating fiber according to claim 2, wherein a ratio of the outside diameter of said core region to the outside diameter of said second cladding satisfies the following condition:

$$2a/2c \leq 0.3.$$

6. A dispersion-compensating fiber for compensating for a dispersion of a predetermined length of a dispersion-shifted fiber having a zero-dispersion wavelength in a 1.5 μm wavelength band, comprising:

a core region extending along a predetermined reference axis and having a core with an outside diameter 2a; and a cladding region which is a region provided on the outer periphery of said core region, said cladding region having a first cladding provided on the outer periphery of said core and having an outside diameter 2b, a second cladding provided on the outer periphery of said first cladding and having an outside diameter 2c, and a third cladding provided on the outer periphery of said second cladding, wherein a refractive index $n_1$ of said core region, a refractive index $n_2$ of said first cladding, a refractive index $n_3$ of said second cladding, and a refractive index $n_4$ of said third cladding satisfy $$n1 > n_3 > n_4 > n_2;$$

wherein, at the wavelength of 1.55 μm, said dispersion-compensating fiber has the dispersion D of −60 ps/nm/km or more and of −50 ps/nm/km or less and a dispersion slope S of 0 ps/nm/km or less.

* * * * *